US009787986B2

(12) United States Patent
Dunphy

(10) Patent No.: US 9,787,986 B2
(45) Date of Patent: Oct. 10, 2017

(54) TECHNIQUES FOR PARALLEL VIDEO TRANSCODING

(71) Applicant: INTEL CORPORATION, Santa Clara, CA (US)

(72) Inventor: Richard Dunphy, Chandler, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 442 days.

(21) Appl. No.: 14/319,406

(22) Filed: Jun. 30, 2014

(65) Prior Publication Data
US 2015/0381978 A1 Dec. 31, 2015

(51) Int. Cl.
*H04N 19/114* (2014.01)
*H04N 19/169* (2014.01)
*H04N 19/40* (2014.01)
*H04N 19/436* (2014.01)
*H04N 19/177* (2014.01)

(52) U.S. Cl.
CPC ......... *H04N 19/114* (2014.11); *H04N 19/177* (2014.11); *H04N 19/188* (2014.11); *H04N 19/40* (2014.11); *H04N 19/436* (2014.11)

(58) Field of Classification Search
None
See application file for complete search history.

(56) References Cited

U.S. PATENT DOCUMENTS

| 5,805,220 A * | 9/1998 | Keesman | H04N 19/115 348/382 |
| 7,991,053 B2 * | 8/2011 | Raveendran | H04N 19/176 375/240.01 |
| 8,325,821 B1 * | 12/2012 | Kizhepat | H04N 21/23434 375/240.26 |
| 2002/0159523 A1 * | 10/2002 | Wang | H04N 21/23655 375/240.05 |
| 2007/0074266 A1 * | 3/2007 | Raveendran | H04N 5/144 725/135 |

(Continued)

OTHER PUBLICATIONS

Ahmad et al., "Video Transcoding: An Overview of Various Techniques and Research Issues", IEEE Transactions on Multimedia, vol. 7, No. 5, Oct. 2005.*

(Continued)

*Primary Examiner* — Mohammad J Rahman

(57) ABSTRACT

Various embodiments are directed to techniques for dividing compressed video data into portions for load balancing or redundancy among multiple video transcoders. A device includes an analysis component to analyze NAL units of compressed video data representing a motion video to identify a GOP refresh, and to compare a period of time represented by frames of the motion video following the GOP refresh to a maximum; a division component to divide the compressed video data at a first point coincident with the GOP refresh to define a start of a compressed video portion, and at a second point to define an end of the compressed video portion to include frames of the motion video representing a shorter period of time between the first and second points than the maximum; and an assignment component to assign the compressed video portion to a transcoding device. Other embodiments are described and claimed.

25 Claims, 14 Drawing Sheets

(56) References Cited

U.S. PATENT DOCUMENTS

| | | | | |
|---|---|---|---|---|
| 2007/0263514 A1* | 11/2007 | Iwata | ............... | G11B 20/00086 |
| | | | | 369/84 |
| 2008/0263621 A1* | 10/2008 | Austerlitz | ........ | H04N 21/43615 |
| | | | | 725/139 |
| 2009/0136209 A1* | 5/2009 | Nonaka | .............. | G11B 20/1262 |
| | | | | 386/329 |
| 2012/0008480 A1* | 1/2012 | Hattori | ............. | G11B 20/00086 |
| | | | | 369/85 |
| 2012/0008921 A1* | 1/2012 | Hattori | ................. | G11B 27/034 |
| | | | | 386/248 |
| 2012/0170643 A1* | 7/2012 | Soroushian | .......... | G11B 27/005 |
| | | | | 375/240.01 |
| 2012/0275516 A1* | 11/2012 | Tanaka | ................... | H04N 19/50 |
| | | | | 375/240.12 |
| 2014/0092963 A1* | 4/2014 | Wang | .............. | H04N 19/00569 |
| | | | | 375/240.12 |
| 2015/0365688 A1* | 12/2015 | Su | ......................... | H04N 19/11 |
| | | | | 375/240.03 |

OTHER PUBLICATIONS

Xin et al., "Digital Video Transcoding", Proceedings of the IEEE, vol. 93, No. 1, Jan. 2005.*

* cited by examiner

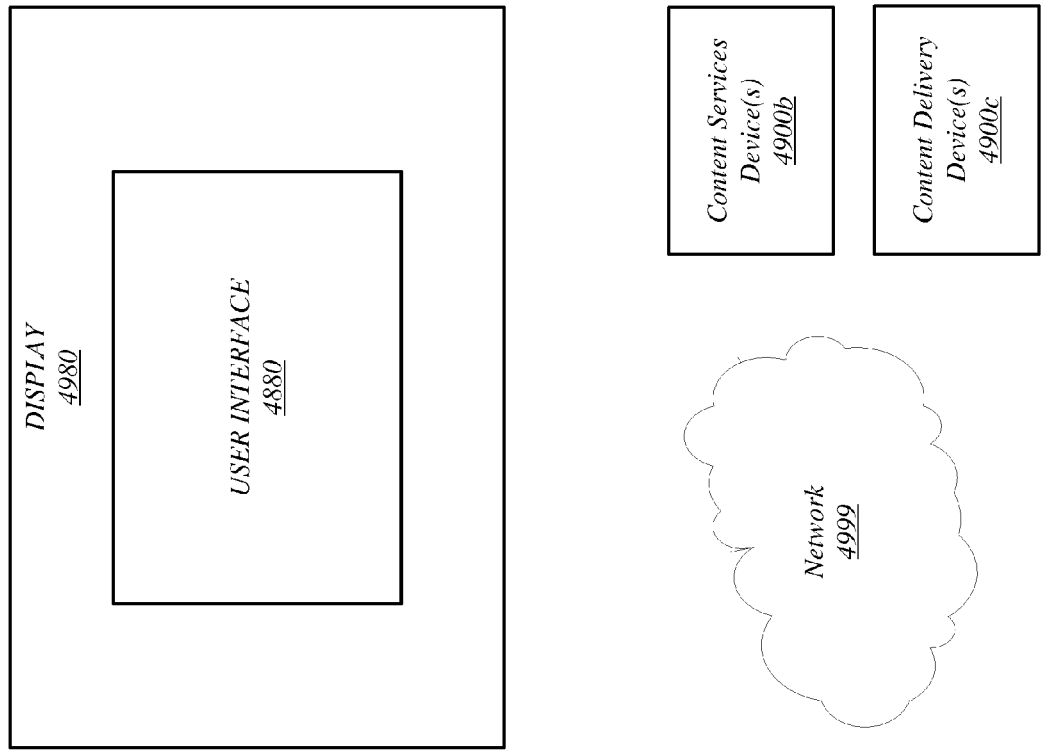
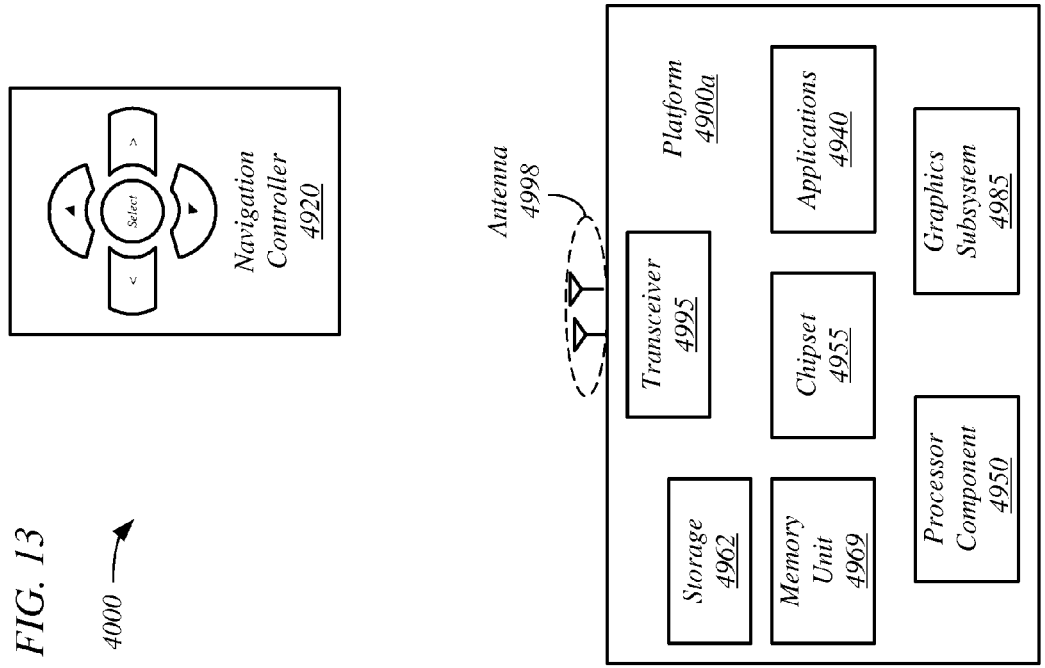
FIG. 13

TECHNIQUES FOR PARALLEL VIDEO TRANSCODING

BACKGROUND

The increasing color depth and resolution with which motion video imagery is digitally captured, stored and viewed now rivals the quality of film-based photography at even a professional level in which expectations of sharpness and color reproduction are heightened. However, these increases also result in increased data sizes, resulting in increased storage capacity and processing requirements for every operation that entails some degree of video processing, including transcoding.

Various types of video compression have been employed in the compression and decompression of video data that represents motion video. Among those types of video compression are versions of the widely used Motion Picture Experts Group (MPEG) specification promulgated by the International Organization for Standardization of Geneva, Switzerland. Specifically, versions of MPEG known widely as MPEG 2 and MPEG 4 (also known as H.264) are widely used in transmitting motion video via satellite, over-the-air and cable-based distribution systems, and as streamed video data via networks (e.g., the Internet). Currently under development is a new version of MPEG known among its developers as high-efficiency video coding ("HEVC") or "H.265" that updates various aspects of MPEG to better address the commonplace adoption of "high definition" television resolutions. Unfortunately, the coming of so-called "4K" resolution (e.g., 3840×2160 pixels) motion video makes clear that increases in data sizes will continue despite improvements in video compression.

This has direct bearing on the difficulty of implementing various forms of transcoding as may be employed by content providers, distributors and others to alter aspects of motion video such as frame rate or resolution, and/or to augment motion video with such features as subtitles and/or other features. Such transcoding often involves both decompressing motion video to enable the intended alterations and/or augmentation, and again compressing the motion video thereafter. In commercial applications such transcoding is often performed continuously with minimal planned interruption, but interruptions due to malfunctions or maintenance inevitably occur. The affects of any such interruption are often made worse by the need for destination devices to build up a buffer of received video data, even after the interruption is over, before decompression to enable display of motion video can even begin coupled with the sheer size of the video data that must be received to build up such a buffer despite improvements in video compression.

BRIEF DESCRIPTION OF THE DRAWINGS

FIG. 13 illustrates another alternate embodiment of a graphics processing system.

DETAILED DESCRIPTION

Figure 1:
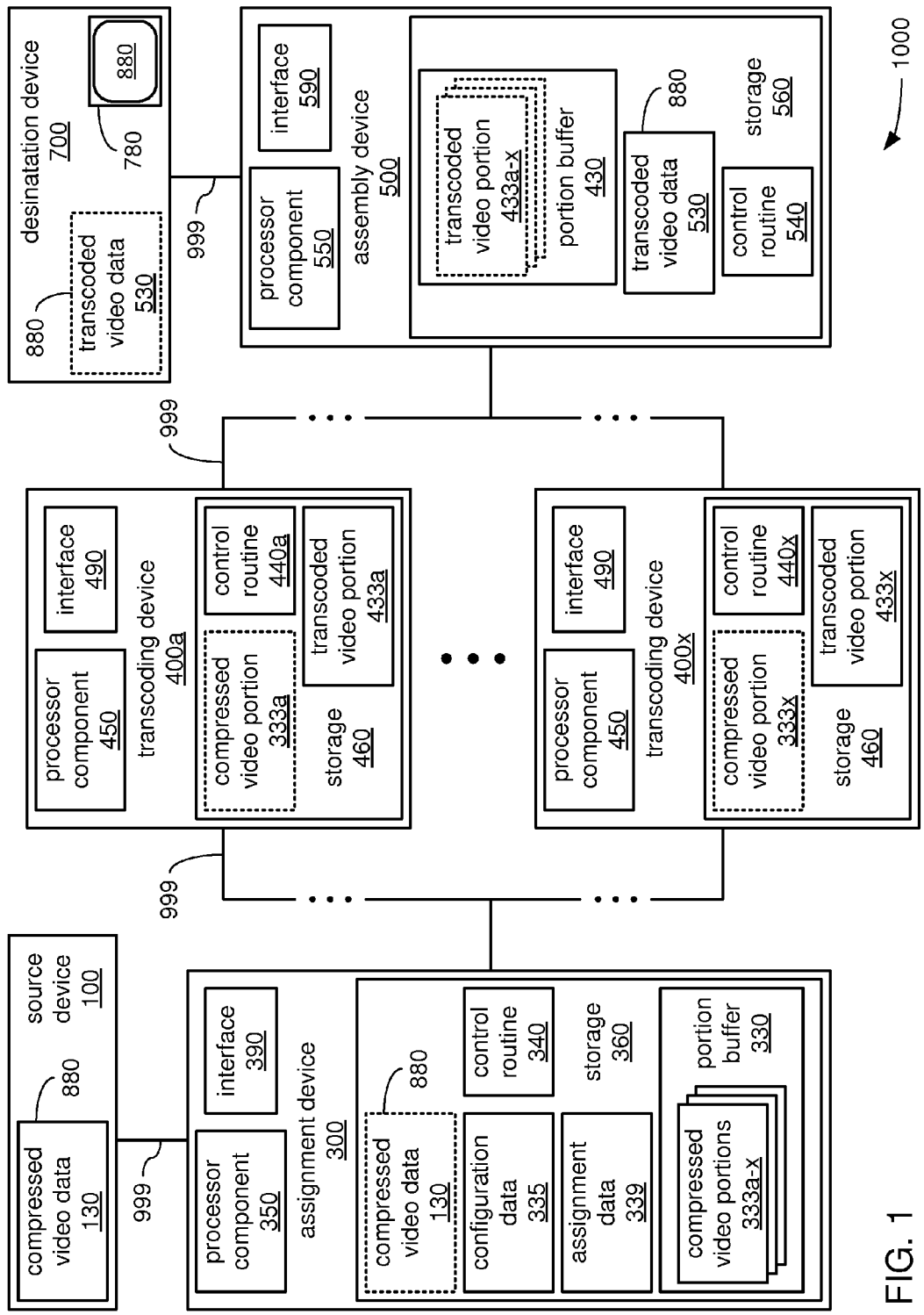
FIG. 1 illustrates an embodiment of a video transcoding system.

Various embodiments are generally directed to techniques for dividing compressed video data representing a motion video into portions for load balancing and/or redundancy among multiple video transcoders operated in parallel. More specifically, network abstraction layer (NAL) units making up a compressed video data are analyzed to identify group-of-picture (GOP) refreshes at which the compressed video data may be divided into portions that may be assigned to different ones of multiple transcoders to transcode such portions in parallel. In instances where greater than a predetermined maximum period of time passes between adjacent GOP refreshes, one or more additional divisions of the compressed video data into such assignable portions may be made between the GOP refreshes. Following the parallel transcoding of portions of the compressed video data, the now transcoded video portions are reassembled into transcoded video data for provision to a destination device.

In some embodiments, a version of MPEG or similar type of compression may be the type of compression employed. In such embodiments, a series of video frames may be compressed to generate compressed frames (e.g., intra-frames (I-frames), predicted frames (P-frames) and/or bi-predicted frames (B-frames)) organized into the GOPs to form a video bitstream represented by the compressed video data. Within that video bitstream, the GOPs may be organized in chronological order while the compressed frames within each GOP may be arranged in either chronological or coding order. Regardless of the manner in which the frames are ordered within each GOP, each frame within each GOP may be represented by one or more NAL units that represent the compressed video data at times when the compressed video data is transmitted via a network. Where the network is packet-based, the NAL units may be distributed among network packets such that some packets may include multiple NAL units and/or some NAL units may be divided among multiple packets.

The compressed video data may be received via a network from a source device. In embodiments in which the network is packet-based, the NAL units of the compressed video data may be retrieved from the packets by which the NAL units were transmitted. Alternatively or additionally, in embodiments in which the compressed video data is encapsulated within a data container along with other data when transmitted, the NAL units may be retrieved from that data container following retrieval of portions of the data container from the packets. Following extraction of the NAL units from such packets and/or such encapsulation, the NAL units may then be arranged in chronological and/or coding order for analysis.

The NAL units may then be analyzed to identify NAL units that indicate occurrences of GOP refreshes in the compressed video data. At each GOP refresh, a break is made in the manner in which the frames are represented in the compressed video data in which there is a point in time between two frames of the motion video in which no frame leading up to that point is further used as a reference by any subsequent frames. This break in references made to earlier frames at such points may enable the compressed video data may be divided at such points into portions that are able to be provided to a transcoders without being accompanied by any earlier portion of the compressed video data.

However, as familiar to those skilled in the art, compressed video data may include instances of relatively long spans of time between GOP refreshes such that a portion formed by dividing only at the points at which GOP refreshes occur may generate a portion of that compressed video data that is too long. To address this, a predetermined maximum period of time for the duration of any portion of a compressed video data to be transcoded may be imposed. Thus, from a point at which a GOP refresh occurs, a first portion may be formed that begins at the point of the GOP refresh and continues up to at least a last frame to be transcoded within the first portion within the predetermined maximum period of time. This first portion may then be provided to one transcoder. Then, a second portion that follows the first portion may be formed that actually includes the entire first portion, but is accompanied by an indication that transcoding is to be performed starting at the frame that chronologically follows that last frame to be transcoded within the first portion. This second portion may then be provided to another transcoder along with that indication of where transcoding is to start.

The progress of the transcoding of each portion may be monitored for an indication of failure to complete the transcoding of a particular portion. Each portion assigned to a transcoder may be buffered to enable the particular portion for which transcoding failed to be completed to be reassigned to another transcoder in response to the failure. Alternatively or additionally, one or more extra transcoders may be made active to take over for one or more other transcoders that have failed to complete the transcoding of a portion of the compressed video data assigned to them.

As familiar to those skilled in the art, the term "transcoding" may encompass any of a variety of video processing activities. By way of example, transcoding may entail altering a characteristic of a motion video, including and not limited to, frame rate, resolution, color depth, etc. By way of another example, transcoding may entail altering a characteristic of the compression of a motion video, including and not limited to, changing compression parameters to compress a motion video to a greater degree, changing types of compression, changing the ordering of frames in compressed form, etc. By way of still another example, transcoding may entail adding a feature to a motion video, including and not limited to, adding subtitles in a selected language, adding digital watermarking, etc.

Each portion of compressed video data provided to a transcoder to be transcoded may include an indication of the order in which those portions are to be reassembled to form a transcoded motion video represented as transcoded video data. In some embodiments, indications of ordering incorporated into the NAL units may be used. In other embodiments, the portions may be provided to the transcoders within a form of encapsulation that includes such an indication. In a similar manner, following completion of transcoding, each transcoded portion may include a similar indication of ordering for use in such reassembly.

Upon the completion of transcoding of multiple portions of compressed video data and their reassembly into transcoded video data, such transcoded video data may be provided to a destination device for storage and/or visual presentation on a display. Such provision may be through a network such that the transcoded video data may be encapsulated within a data container and/or conveyed in packets.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an embodiment of a video transcoding system 1000 incorporating one or more of a source device 100, an assignment device 300, multiple transcoding devices 400*a-x*, an assembly device 500 and a destination device 700. In the video transcoding system 1000, compressed video data 130 that represents a motion video 880 in compressed form may be generated and/or stored by the source device 100. The compressed video data 130 may then be received from the source device 100 and divided into compressed video portions 333*a-x* by the assignment device 300, and the assignment device 300 may then assign different ones of the transcoded video portions 333*a-x* to different ones of the transcoding devices 400*a-x* to be transcoded in parallel. The following transcoding, each of the transcoding devices 400*a-x* may provide the resulting transcoded video portions to the assembly device 500. The assembly device 500 may assemble the transcoded video portions 433*a-x* into a transcoded video data 530 that represents the motion video 880, and may then provide the transcoded video data 530 to the destination device 700. Upon receiving the transcoded video data 530, the destination device may decompress the transcoded video data 530 and display the motion video 880 on a display 780 associated with the destination device 700. Each of these devices 100, 300, 400*a-x*, 500 and 700 may be any of a variety of types of computing device, including without limitation, a desktop computer system, a data entry terminal, a laptop computer, a netbook computer, a tablet computer, a handheld personal data assistant, a smartphone, smart glasses, a smart wristwatch, a digital camera, a body-worn computing device incorporated into clothing, a computing device integrated into a vehicle (e.g., a car, a bicycle, a wheelchair, etc.), a server, a cluster of servers, a server farm, etc.

As depicted, these devices 100, 300, 400*a-x*, 500 and/or 700 exchange signals conveying data representing at least a portion of the motion video 880 and/or related data through a network 999. However, one or more of these computing devices may exchange other data entirely unrelated to the motion video 880 with each other and/or with still other computing devices (not shown) via the network 999. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission. It should also be noted that such data may alternatively be exchanged via direct coupling of a removable storage (e.g., a solid-state storage based on FLASH memory technology, an optical disc medium, etc.) at different times to each.

As depicted, the source device 100 may be coupled to the assignment device 300 through the same network 999 as couples others of the computing devices 300, 400*a-x*, 500 and/or 700 to provide the compressed video data 130 to the assignment device 300. However, in other embodiments, the source device 100 may be coupled to the assignment device 300 in an entirely different manner. At least a subset of the compressed video data 130 may have been created via the source device 100, e.g., where the source device 100 either is or incorporates a camera such that the compressed video data 100 includes representations of the frames of the motion video 880 captured by the source device 100. Alternatively or additionally, at least a subset of the compressed video data 130 may simply be stored on the source device 100 for later conveyance to the assignment device 300 following the receipt of the compressed video data 130 from yet another device (not shown).

In various embodiments, the assignment device 300 incorporates one or more of a processor component 350, a storage 360 and an interface 390 to couple the assignment device 300 to the network 999. The storage 360 stores one or more of a control routine 340, the compressed video data 130, configuration data 335, assignment data 339 and a portion buffer 330 in which one or more of the compressed video portions 333*a-x* are stored. The control routine 340 incorporates a sequence of instructions operative on the processor component 350 in its role as a main processor component of the computing device 300 to implement logic to perform various functions.

In executing the control routine 340 in some embodiments, the processor component 350 may receive the compressed video data 130 representing the motion video 880 from the source device 100, and may store at least a subset thereof in the storage 360. Alternatively, the compressed video data 130 may be provided to the assignment device 300 via another mechanism such as by removable media, from which the processor component 350 may retrieve at least a subset of the compressed video data 130 to store in the storage 360. It should be noted that the compressed video data 130 may be stored in the storage 360 for a considerable amount of time before any use is made of it, including division into portions, visual presentation and/or transmission thereof.

In embodiments in which the compressed video data 130 is provided to the assignment device 300, a host-client relationship may exist between the source device 100 and the assignment device 300 by which the processor component 350 may employ the source device 100 as a remote storage device. In such embodiments, the processor component 350 may operate the interface 390 to request at least a subset of the compressed video data 130 from the source device 100. In other embodiments, the source device 100 may stream at least a subset of the compressed video data 130 to the assignment device 300.

Regardless of the exact manner in which the assignment device 300 is provided with at least a subset of the compressed video data 130, the processor component 350 may be caused by further execution of the control routine 340 to analyze NAL units of the compressed video data 130 to identify occurrences of GOP refreshes providing opportunities to divide the compressed video data 130 into ones of the compressed video portions 333*a-x*. The processor component 350 may then assign different ones of the compressed video portions 333*a-x* to different ones of transcoding devices 400*a-x* to be transcoded in parallel as part of providing load balancing and/or redundancy in the transcoding of the compressed video data 130.

However, as familiar to those skilled in the art, great variances exist in video encoders and in the manner in which video encoders may be configured to optimize characteristics of the compressed video they generate to suit any of a variety of goals. As a result, the amount of time between adjacent points in the motion video 880 at which GOP refreshes occur may be as little as a fraction of a second to at least as great as several seconds. In some embodiments, one or more of the transcoding devices 400*a-x* may not be able to accommodate transcoding a portion of a motion video that is longer than a predetermined maximum period of time. Alternatively or additionally, it may be deemed undesirable to assign portions of a motion video to any of the transcoding devices 400*a-x* for transcoding that are longer than the predetermined maximum period of time as part of achieving load balancing and/or redundancy in the performance of transcoding by the transcoding devices 400*a-x*.

Therefore, in generating the compressed video portions 333*a-x*, the processor component 350 may further divide the compressed video data 130 at one or more points following a GOP refresh to ensure that none of the compressed video portions 333*a-x* convey a portion of the motion video 880 to be transcoded that represents a portion of the motion video 880 that is longer than the predetermined maximum period of time. This predetermined maximum period of time may be stored as an operating parameter within the configuration data 335, from which the processor component 350 may retrieve it.

Regardless of the exact manner in which the compressed video data 130 may be divided to generate the compressed video portions 333a-x, after assigning different ones of the compressed video portions 333a-x to different ones the transcoding devices 400a-x, the processor component 350 is further caused by its execution of the control routine 340 to monitor the performance of transcoding by each of the transcoding devices 400a-x. In response to an indication of failure of one of the transcoding devices 400a-x to transcode one of the compressed video portions 333a-x, the processor component 350 may reassign that one of the compressed video portions 333a-x to another of the transcoding devices 400a-x. To enable oversight of the performance of transcoding of each of the compressed video portions 333a-x, the processor component 350 may maintain indications of which of the compressed video portions 333a-x have been assigned to which of the transcoding devices 400a-x as part of the assignment data 339. To enable reassignment of one or more compressed video portions 333a-x to others of the transcoding devices 400a-x, the processor component 350 may store each one of the compressed video portions 333a-x within the portions buffer 330 until the processor component 350 receives an indication of completion of transcoding of that one of the compressed video portions 333a-x.

Figure 3:
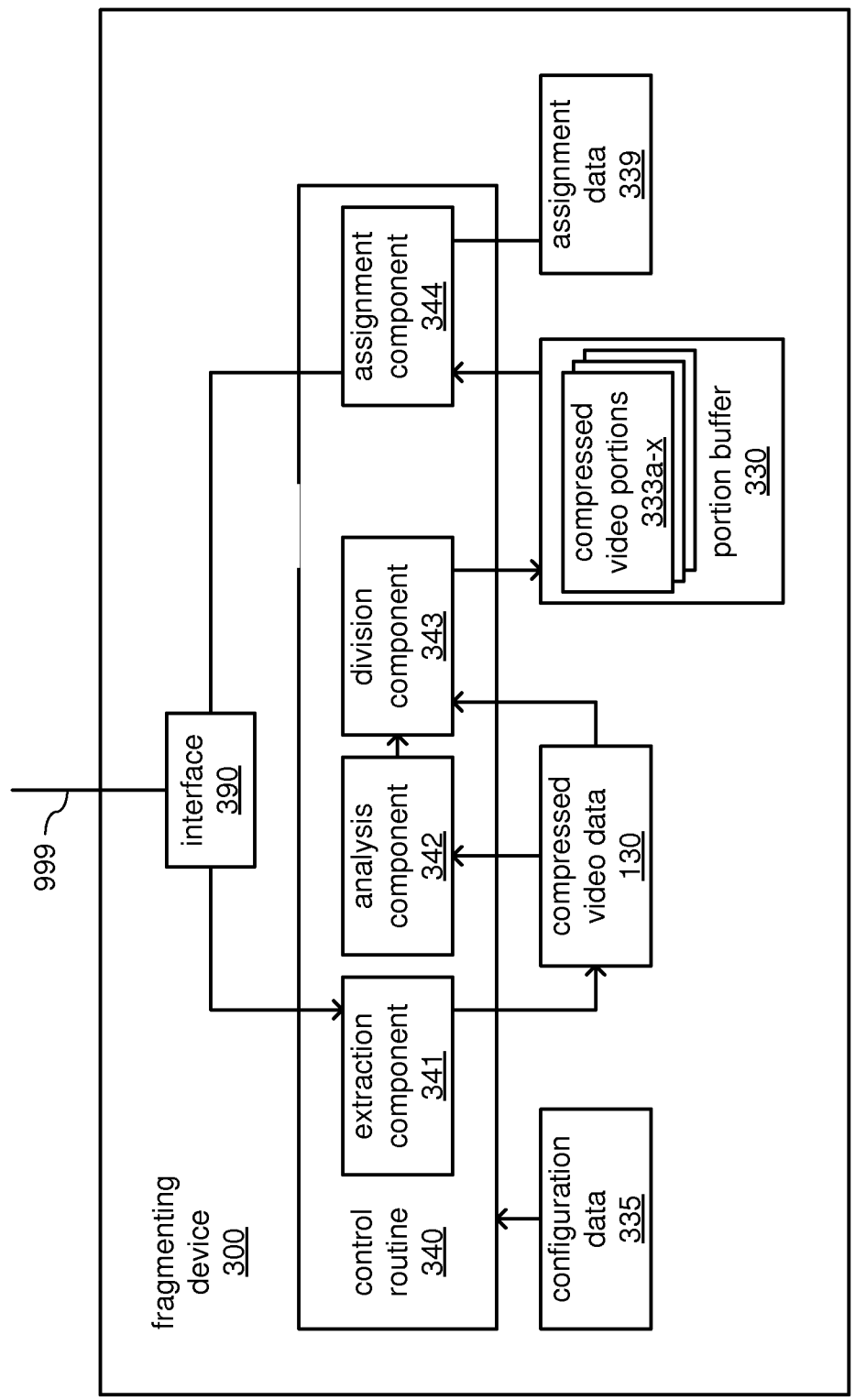
FIG. 3 illustrates a portion of an example embodiment.

FIG. 3 depicts an example embodiment of such dividing of the compressed video data 130 into the compressed video portions 333a-x and such assignment of the compressed video portions 333a-x for transcoding in greater detail. As depicted, the control routine 340 may incorporate one or more of an extraction component 341, an analysis component 342, a division component 343 and an assignment component 344. In executing the control routine 340, the processor component 350 may execute one or more of the components 341-344 of the control routine 340.

Figure 4:
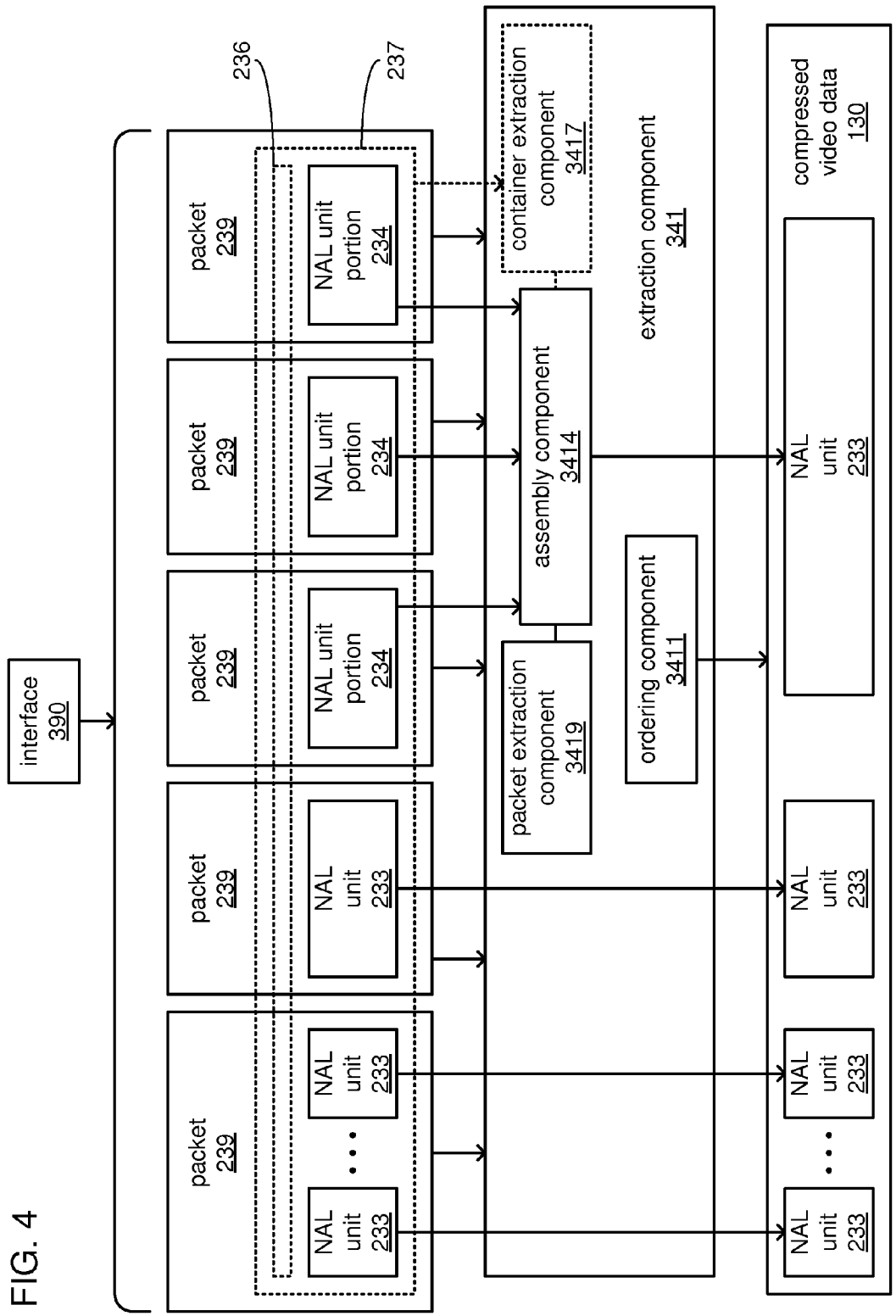
FIG. 4 illustrates an example embodiment of extracting NAL units.

The extraction component 341 may operate the interface 390 to receive the compressed video data 130 via the network 999 from the source device 100. As previously discussed, the source device 100 may stream the compressed video data 130 to the assignment device 300, or the processor component 350 may operate the interface 390 to request the compressed video data 130 from the source device 100 as a client requesting the provision of data from a remote host. Regardless of the circumstances under which the compressed video data 130 is conveyed to the assignment device 300 via the network 999, the extraction component 341 may extract NAL units making up the compressed video data 130 from packets by which the video data 130 is conveyed via the network 999 in embodiments in which the network 999 is a packet-based network. FIG. 4 depicts an example embodiment of such extraction of NAL units of the video data 130 in greater detail.

As depicted, the compressed video data 130 includes multiple NAL units 233, and the NAL units 233 may be conveyed via the network 999 in packets 239. As familiar to those skilled in the art, each NAL unit 233 may represent a portion of a frame of the motion video 880 or an entire frame of the motion video 880, such that the size of the NAL units 233 may vary greatly. As a result of this wide range of possible sizes for each NAL unit 233, it is possible for a single packet 239 to convey multiple ones of the NAL units 233, for a single packet 239 to convey a single NAL unit 233, and/or for a single NAL unit 233 to be conveyed as multiple NAL unit portions 234 distributed among multiple ones of the packets 239.

As also depicted, the extraction component 341 may incorporate one or more of a packet extraction component 3419, a container extraction component 3417, an assembly component 3414 and an ordering component 3411. The packet extraction component 3419 extracts the NAL units 233 from the packets 239 in embodiments in which the network 999 is a packet-based network. However, where a single NAL unit 233 is of such size that it is conveyed via multiple packets 239 as multiple NAL unit portions 234, the packet extraction component 3419 may cooperate with the assembly component 3414 to extract the multiple NAL unit portions 234 from multiple packets 239 and reassemble that single NAL unit 233 from the multiple NAL unit portions 234.

In some embodiments, the compressed video data 130 may be provided to the assignment device 300 as part of a data container 237 in which the compressed video data 130 is conveyed alongside other data 236. In embodiments in which the compressed video data 130 is provided to the assignment device 300 via the network 999, portions of the data container 237 may be divided among multiple ones of the packets 239. The other data 236 may or may not be related to the compressed video data 130 and/or the motion video 880 represented by the compressed video data 130. In embodiments in which the compressed video data 130 is conveyed within the data container 237, the container extraction component 3417 may cooperate with the packet extraction component 3419 to extract the compressed video data 130 from the data container 237.

As familiar to those skilled in the art, where data is convey through a packet-based network via multiple packets, those packets may be received out of order despite having been originally transmitted in order. As a result, following the extraction of the NAL units 233 from the packets 239 in embodiments in which the compressed video data 130 is conveyed via the network 999 and in which the network 999 is packet-based, the ordering component 3411 may form at least a subset of the compressed video data 130 within the storage 360 with the NAL units 233 in an order that conveys GOPs of the compressed video data 130 in correct order.

Figure 5:
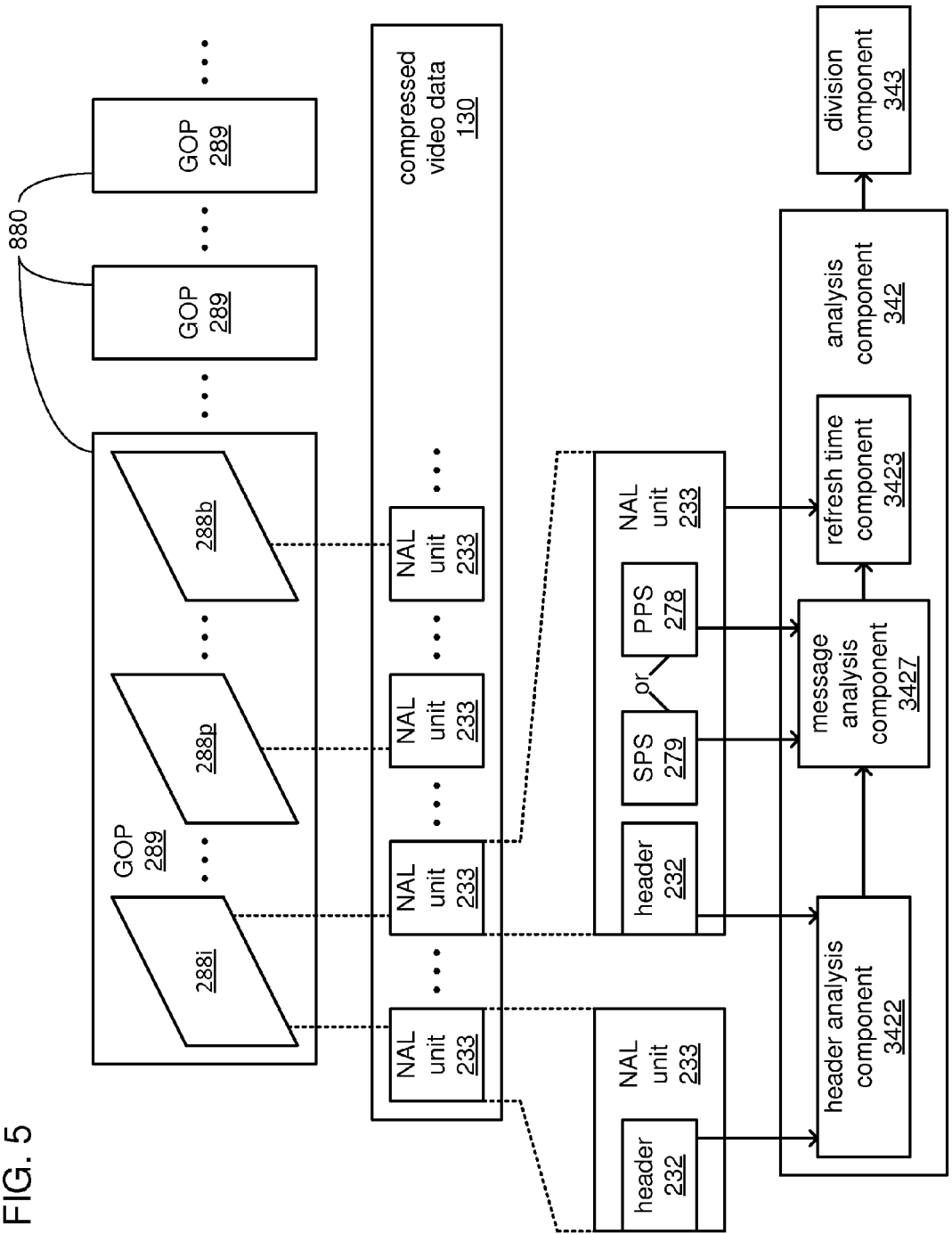
FIG. 5 illustrates an example embodiment of analyzing a NAL unit.

Returning to FIG. 3, following extraction and ordering of the NAL units 233 to form at least a subset of the compressed video data 130 within the storage 360, the analysis component 342 analyzes the NAL units 233 of the compressed video data 130 to identify occurrences of GOP refreshes and/or to measure the periods of time occurring within the motion video 880 between GOP refreshes. FIG. 5 depicts an example embodiment of such analysis of the NAL units 233 in greater detail.

As depicted, each GOP 289 may include multiple frames of the motion video 880 that are compressed in a manner that generates different types of compressed frames, including I-frames 288i, P-frames 288p and/or B-frames 288b. As familiar to those skilled in the art, the I-frames 288i are typically of a larger data size, while the P-frames 288p and the B-frames 288b each tend to be of smaller data sizes. As a result, the data of the I-frames 288i typically spans more than one of the NAL units 233, while the data of the P-frames 288p and the B-frames 288b each frequently occupy a single NAL unit 233.

Each GOP 289 typically begins with an I-frame 288i, such that each GOP 289 begins with a frame that is "standalone" inasmuch as the data describing the contents of an I-frame 288i within the compressed image data 130 does not do so with reference to any other frame. However, it is still possible for the contents of one or more P-frames 288p and/or one or more B-frames 288b of a chronologically later GOP 289 to be described with data that makes reference to another frame in a chronologically earlier GOP 289 such that decompression of the frames of the chronologically later GOP 289 cannot be performed independently of the chronologically earlier GOP 289. Alternatively or additionally, a chronologically earlier GOP 289 may include one or messages describing aspects of the compression of multiple frames within that GOP 289 and a chronologically later GOP 289 such that, again, decompression of the frames of the chronologically later GOP 289 cannot be performed independently of the chronologically earlier GOP 289. A GOP refresh occurs at the beginning of a GOP 289 in which neither the frames nor the messages therein make any reference to or in any other way rely on a frame or a message of any chronologically earlier GOP 289. At least one of the NAL units 233 of the I-frame 288i at the beginning of such a GOP 289 typically includes one or more indications that a GOP refresh is occurring coincident with the beginning of that GOP 289.

As also depicted, each NAL unit 233 begins with a header 232 that may include a value specifying a NAL reference identifier (NRI) and another value specifying a NAL unit type that, together, describe aspects of the contents of the NAL unit 233. Further, a NAL unit 233 may include a sequence parameter set (SPS) message and/or a picture parameter set (PPS) message. A SPS message is typically employed to specify one or more aspects of compression for a sequence of numerous frames that may span one or more GOPs, such as and not limited to, a quantization parameter, a pixel resolution, a color depth, whether the frames are arranged in chronological or coding order, etc. A PPS message is typically employed to specify one or more of such aspects of compression for a single frame and/or a relatively small quantity of frames. For a GOP refresh to occur coincident with the start of a GOP 289, the I-frame 288i at the beginning of that GOP 289 must be one that is not followed by any other frame that makes reference to any frame in a chronologically earlier GOP 289. Such an I-frame is sometimes referred to as an instantaneous decoder refresh (IDR) frame. In addition to that I-frame 288i being an IDR frame at the beginning of that GOP 289, there must be at least one of a SPS or PPS message specifying aspects of the compression of the frames within that GOP 289 starting with the IDR frame such that no SPS or PPS need be retrieved from a chronologically earlier GOP 289 to obtain a specification of those aspects.

As further depicted, the analysis component 342 may include one or more of a header analysis component 3422, a message analysis component 3427 and a refresh time component 3423. The header analysis component 3422 and the message analysis component 3427 may cooperate to detect a GOP refresh occurring coincident with the start of a GOP 289. More specifically, the header analysis component 3422 may analyze the header 232 of each NAL unit 233 to identify a NAL unit 233 having a header 232 including a NRI value and a NAL unit type value indicating that the NAL unit 233 includes a portion of an IDR frame and/or that the NAL unit 233 includes a SPS message and/or a PPS message specifying aspects of compression. By way of example, in embodiments in which the compressed video data 130 conforms to a version of the MPEG specification, such a NRI value may a value of three. In response to detection of such an indication within the header 232 of a NAL unit 233, the header analysis component 3422 may further analyze that header 232 to identify from the NAL unit type value whether that NAL unit 233 includes a portion of an IDR frame (e.g., a NAL unit type value of 5), a PPS message (e.g., a NAL unit type value of 8), or a SPS message (e.g., a NAL unit type value of 7). If that NAL unit 233 is indicated by the NAL unit type value as including a PPS message 278 or a SPS message 279, then the message analysis component 3427 may analyze that PPS message 278 or the SPS message 279 to determine whether the message included in that NAL unit 233 specifies aspects of compression of the frames within a GOP 289 starting with the IDR of that GOP 289.

If the header analysis component 3422 detects at least one NAL unit 233 that includes a portion of an IDR frame at the beginning of a GOP 289, and the message analysis component 3427 detects that another NAL unit 233 of the same GOP 289 includes either a PPS message 278 or a SPS message 279 specifying aspects of compression of frames of that GOP starting with that same IDR frame, then a GOP refresh has been detected that coincident with the beginning of that GOP 289. The analysis component 342 may respond to the detection of the GOP refresh by signaling the division component 343 to divide the compressed video data 130 at the point at which that GOP refresh has been detected to generate one of the compressed video portions 333a-x.

Figure 6:
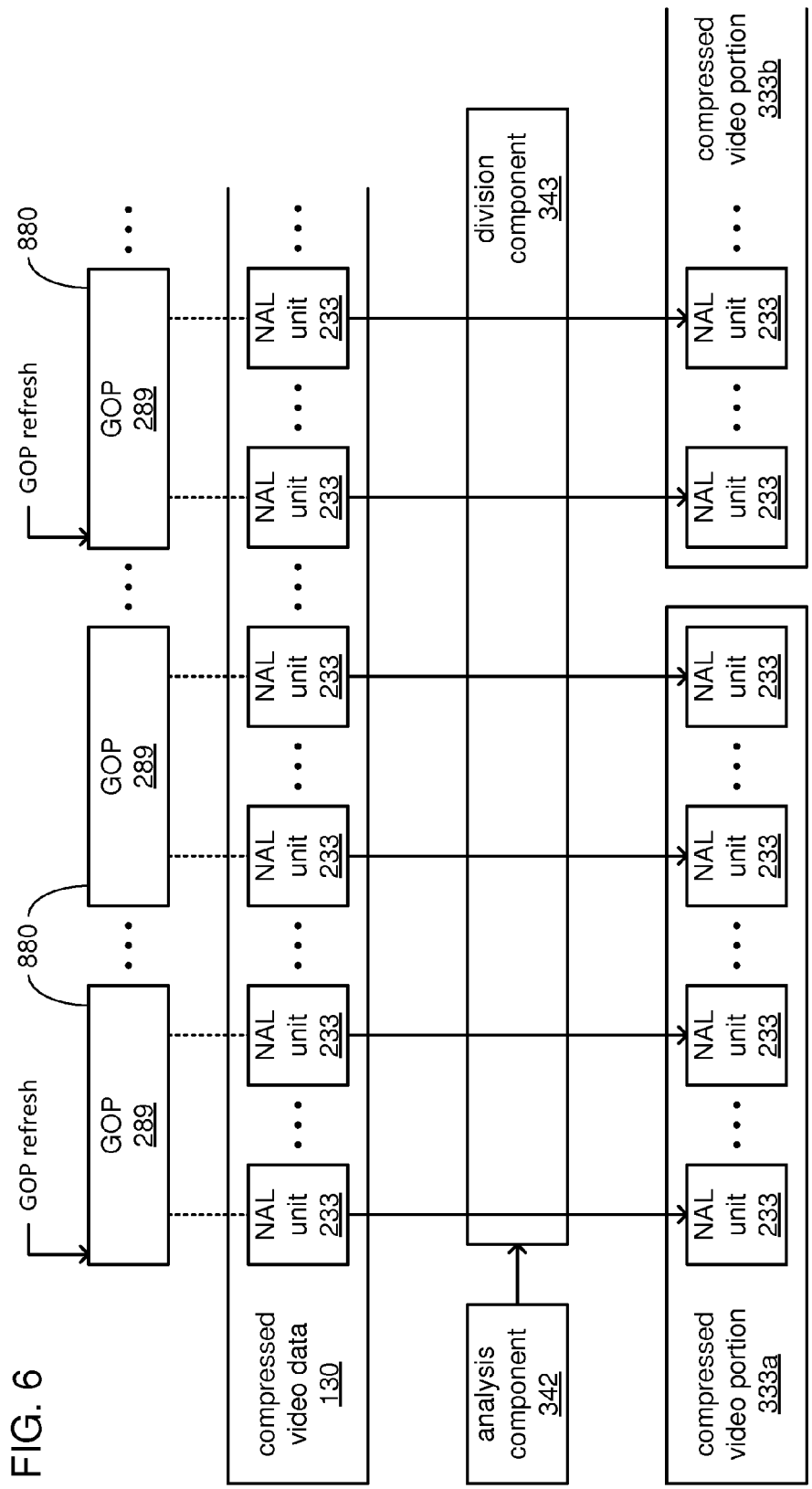
FIGS. 6-7 each illustrate an example embodiment of generating compressed video portions from compressed video data.

FIG. 6 depicts an example embodiment of such division of the compressed video data 130 into portions in response to detection of a GOP refresh. The depicted example subset of the compressed video data 130 includes a series of GOPs 289 that may have been arranged in chronological order by the ordering component 3411 (by arranging the NAL units 233 to cause the GOPs 289 to be in chronological order), and the beginnings of two of those GOPs 289 are each coincident with a GOP refresh. Upon detection of the first of the two GOP refreshes by the analysis component 342, the division component 343 divides the compressed video data 130 at the point at which that first GOP refresh occurs to define the beginning of the compressed video portion 333a. Upon detection of the second of the two GOP refreshes by the analysis component 342, the division component 343 divides the compressed video data 130 again at the point at which that second GOP refresh occurs to define the end of the compressed video portion 333a and the beginning of the compressed video portion 333b. Thus, as depicted, the compressed video portion 333a is defined by the division component 343 as starting at a point coincident with the occurrence of the first GOP refresh (e.g., starting with the NAL unit 233 that is coincident with the start of the GOP 289 that starts coincident with the first GOP refresh), but ending at a point before the second GOP refresh (e.g., ending with the end of the NAL unit 233 that is coincident with the end of the GOP 289 that immediately precedes the GOP 289 that starts at a point coincident with the second GOP refresh).

Returning to FIG. 5, the refresh time component 3423 may track the quantity of frames of the motion video 880 represented by the each NAL unit 233 to maintain a count of frames following the most recently detected GOP refresh to determine if that count represents an amount of time within the motion video 880 that exceeds a predetermined maximum period of time between GOP refreshes. As previously discussed, an indication of the predetermined maximum period of time may be retrieved from the configuration data 335. If a GOP refresh is followed by another GOP refresh within a quantity of frames of the motion video 880 that represents an amount of time that is less than the predetermined maximum period of time, then the division component 343 is signaled to divide the compressed video data 130 at the points at which those GOP refreshes occur to define one of the compressed video portions 333a-x with a start and an end coincident with the occurrences of those GOP refreshes, as has been described.

However, if a GOP refresh is not followed by another GOP refresh within a quantity of frames of the motion video 880 that represents an amount of time that is less than the predetermined maximum period of time, then the division component 343 is signaled by the refresh time component 3423 of the analysis component 342 to divide the compressed video data 130 at a second point following a first point at which that GOP refresh occurs to define the end of a first one of the compressed video portions 333a-x. More precisely, that first one of the compressed video portions 333a-x begins at the first point at which the GOP refresh occurs and ends at the second point signaled by the refresh time component 3423, and that first one of the compressed video portions 333a-x includes a quantity of frames of the motion video 880 to be transcoded between the first and second points that represents no more than the predetermined maximum period of time. The division component 343 is further signaled to form a second one of the compressed video portions 333a-x that actually includes duplicates of the content of the first one of the compressed video portions 333a-x between the first and second points, but which extends beyond the second point and ends at a later third point. The third point may be where another GOP refresh occurs if that other GOP refresh occurs soon enough following the second point that the quantity of frames of the motion video 880 therebetween does not represent a period of time greater than the predetermined maximum period of time. Otherwise, the third point may be where the refresh time component 3423 again signaled the division component 343 to divide the compressed video data 130 to define a quantity of frames of the motion video 880 between the second and third points that again represents a period of time that does not exceed the predetermined maximum period of time.

Figure 7:
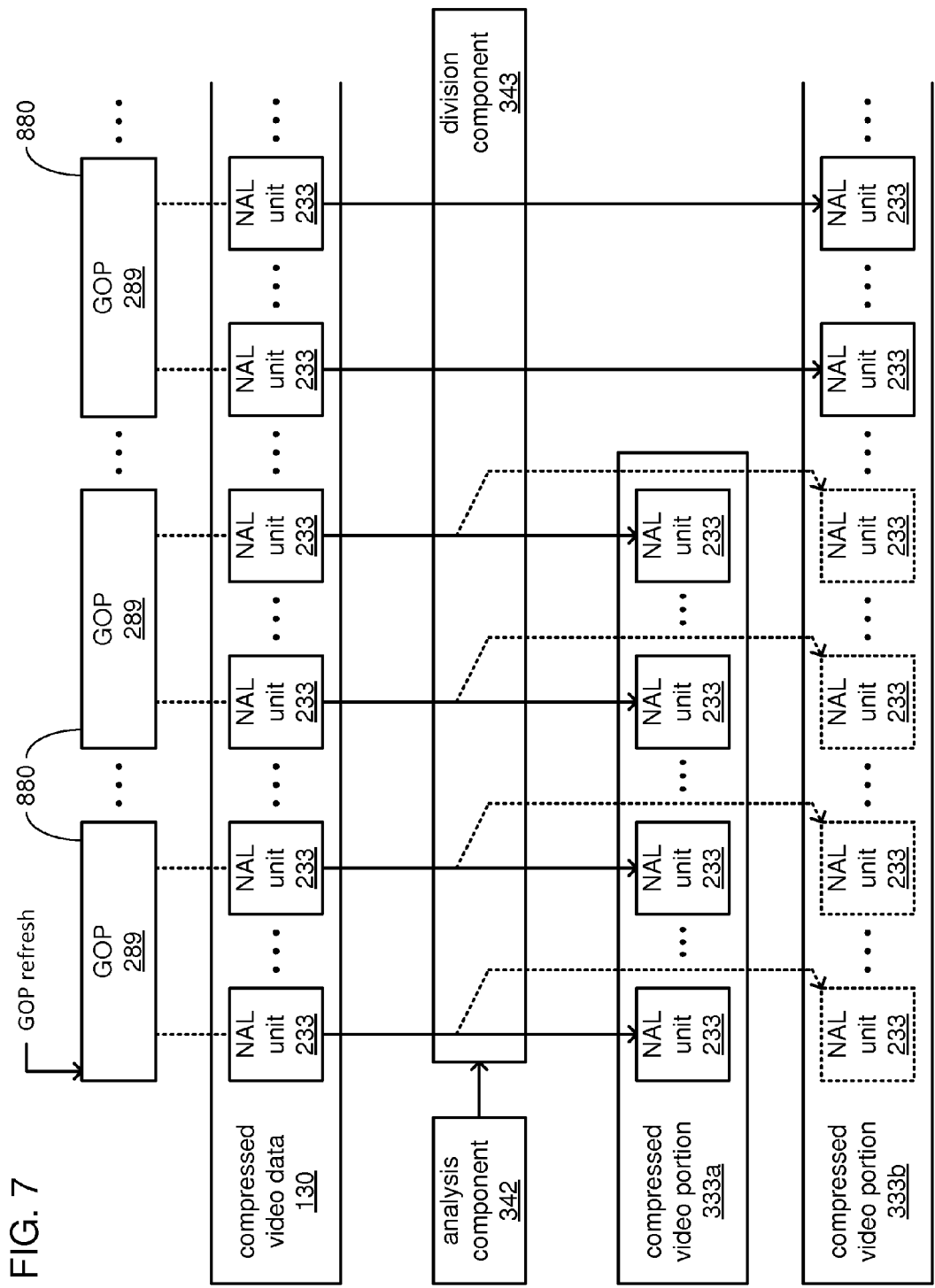

FIG. 7 depicts an example embodiment of such division of the compressed video data 130 into portions in response to such a lack of detection of a later GOP refresh following an earlier detected GOP refresh within a quantity of frames of the motion video 880 representing up to a predetermined maximum period of time. The depicted example subset of the compressed video data 130 includes a series of GOPs 289 that may have been arranged in chronological order by the ordering component 3411 (by arranging the NAL units 233 to cause the GOPs 289 to be in chronological order), and the beginning of one of those GOPs 289 is coincident with a GOP refresh. Upon detection of this one depicted GOP refresh by the analysis component 342, the division component 343 divides the compressed video data 130 at the point at which that first GOP refresh occurs to define the beginning of the compressed video portion 333a. However, upon not detecting another GOP refresh within a quantity of the frames of the motion video 880 that represents less than the predetermined maximum period of time, the division component 343 is signaled to define an end to the quantity of frames to be transcoded within the compressed video portion 333a that does not represent a period of time exceeding the predetermined maximum period of time. Thus, as depicted, the compressed video portion 333a is defined by the division component 343 as starting at a point coincident with the occurrence of the one depicted GOP refresh (e.g., starting with the NAL unit 233 that is coincident with the start of the GOP 289 that is coincident with the one depicted GOP refresh), but ending at a point long before another GOP refresh is detected.

Further, the division component 343 generates the compressed video portion 333b to include duplicates of all of the NAL units 233 that are incorporated into the compressed video portion 333a. However, the division component 343 also generates the compressed video portion 333b to include a quantity of additional NAL units 233 corresponding to GOPs 289 that chronologically follow the GOPs 289 represented by the NAL units 233 duplicated from the compressed video portion 333a. How many of the additional NAL units 233 may be included in the compressed video portion 333b may be determined by where in the compressed video data 130 another GOP refresh occurs if another one does occur within a quantity of frames of the motion video 880 since the point at which the compressed video portion 333a ends that does not represent a period of time greater than the predetermined maximum period of time. Otherwise, how many of the additional NAL units 233 may be included in the compressed video portion 333b may be determined by the refresh time component 3423 signaling the division component 343 to the define the end of the compressed video portion 333b to include an amount of the additional NAL units 233 representing a quantity of frames of the motion video 880 that represents a period of time that is no greater than the predetermined maximum period of time.

Regardless of how many additional NAL units 233 are included in the compressed video portion 333b, it is those additional NAL units 233 that follow the NAL units 233 duplicated from the compressed video portion 333a that are to be transcoded by one of the transcoding devices 400a-x, and not the NAL units 233 duplicated from the compressed video portion 333a (as reflected by the depiction of those duplicate NAL units 233 in dotted lines). As recognizable to those skilled in the art, the inclusion of the NAL units 233 duplicated from the compressed video portion 333a within the compressed video portion 333b is to address the necessity of having access to those duplicate NAL units 233 to support the transcoding of the additional NAL units 233 of the compressed video portion 333b. This necessity arises from the fact that the compressed video portion 333a was defined to end, not at a point coincident with another GOP refresh, but at a point amidst the NAL units 233 extending between two GOP refreshes. Thus, the first of the frames of the motion video 880 to be transcoded in the compressed video portion 333b can only be decompressed as part of the transcoding process if the one of the transcoders 400a-x to which the compressed video portion 333b is assigned is also provided with those NAL units 233 duplicated from the compressed video portion 333a to ensure that reference frames and/or messages needed for such decompression are available. Thus, although the compressed video portion 333b is a superset of the compressed video portion 333a, only the frames of the motion video 880 represented by the NAL units 233 that are unique to the compressed video portion 333b (such that they are not also present in the compressed video portion 333a) are transcoded.

As previously explained, an indication of the predetermined maximum period of time may be indicative of an upper limit in the quantity of frames of the motion video 880 that any of the transcoding devices 400a-x may be capable of transcoding. Such an upper limit may be determined, at least in part, by the size of a buffer maintained by one or more of the transcoding devices 400a-x in which a quantity of frames to be transcoded may be stored. Alternatively or additionally, the predetermined maximum period of time may be selected as part of a strategy of providing load balancing and/or redundancy in the transcoding of the frames of the motion video 880. More specifically, the predetermined maximum period of time may be indicative of an upper limit of the quantity of frames of the motion video 880 for which transcoding may be delayed while one of the compressed video portions 333a-x is reassigned to another of the transcoding devices 400a-x in response to failure of the one of the transcoding devices 400a-x to which it was originally assigned without the delay causing a break in the provision of transcoded frames of the motion video 880 to the destination device 700.

Returning to the FIG. 3, in generating each of the compressed video portions 333a-x from divisions made in the compressed video data 130, the division component 343 may store the each of the compressed video portions 333a-x within the portion buffer 330 for retrieval and assignment for transcoding by the assignment component 344. The assignment component 344 may operate the interface 390 to monitor the state of each of the transcoding devices 400a-x for indications of which one(s) of the transcoding devices 400a-x are available to assign one of the compressed video portions 333a-x to for decoding. It should be noted that the transcoding system 1000 may include a greater quantity of the transcoding devices 400a-x than are needed at any one time. One or more of the transcoding devices 400a-x may be maintained by the assignment component 344 on a "standby" basis to be put to use in instances where there is an increase in the rate of transcoding required that cannot be met by the ones of the transcoding devices 400a-x that are already actively engaged in transcoding. Alternatively or additionally, the assignment component 344 may so maintain one or more of the transcoding devices 400a-x on a standby basis to enable one of the compressed video portions 333a-x to be reassigned to one of the transcoding devices 400a-x that are maintained on standby in response to an occurrence of a transcoding failure in one of the actively engaged transcoding devices 400a-x.

In some embodiments, the assignment component 344 may monitor the state of one or more of the transcoding devices 400a-x through the transmission of recurring queries of their state via the network 999. In other embodiments, the transcoding devices 400a-x may transmit an indicator of their current states (e.g., a so-called "heartbeat" signal) to the assignment device 300 via the network at regular intervals or on some other recurring basis by which the lack of receipt of such a signal at the assignment device 300 from one of the transcoding devices 400a-x may provide an indication of a failure thereof.

In some embodiments, the indications of the state of one or more of the transcoding devices 400a-x may include an indication of a degree of progress in transcoding one of the compressed video portions 333a-x. In such embodiments, the assignment component 344 may treat the lack of receipt of such indications of state as an indication of failure to complete the transcoding of one of the compressed video portions 333a-x, and may respond to such a lack of receipt of such indications by reassigning that one of the compressed video portions 333a-x to another of the transcoding devices 400a-x.

The assignment component 344 may cause each one of the compressed video portions 333a-x to be stored in the portion buffer 330 until confirmation is received from one of the transcoding devices 400a-x that transcoding has been completed for that one of the compressed video portions 333a-x. Alternatively, such confirmation may be received from the assembly device 500 in response to the assembly device 500 receiving the corresponding one of the transcoded video portions 433a-x. To enable the assignment component 344 to monitor the progress of the transcoding of each of the compressed video portions 333a-x, the assignment component 344 may store indications of which of the compressed video portions 333a-x has been assigned to which of the transcoding devices 400a-x within the assignment data 339.

Returning to FIG. 1, in various embodiments, each of the transcoding devices 400a-x incorporates one or more of a processor component 450, a storage 460 and an interface 490 to couple each of the transcoding devices 400a-x to the network 999. The storage 460 stores one or more of a control routine 440, one of the compressed video portions 333a-x and a corresponding one of the transcoded video portions 433a-x. It should be noted that the use of reference numbers 400a-x in connection with the depicted transcoding devices is meant to make clear that the multitude of transcoding devices included in the transcoding system 1000 may be of any quantity of transcoding devices greater than one. In some embodiments, there may be a greater quantity of the transcoding devices 400a-x than are normally used in transcoding at any one time to ensure that there is at least one of the transcoding devices 400a-x available on a standby basis to be put to use should a problem develop with one of the others, as has been described.

Figure 8:
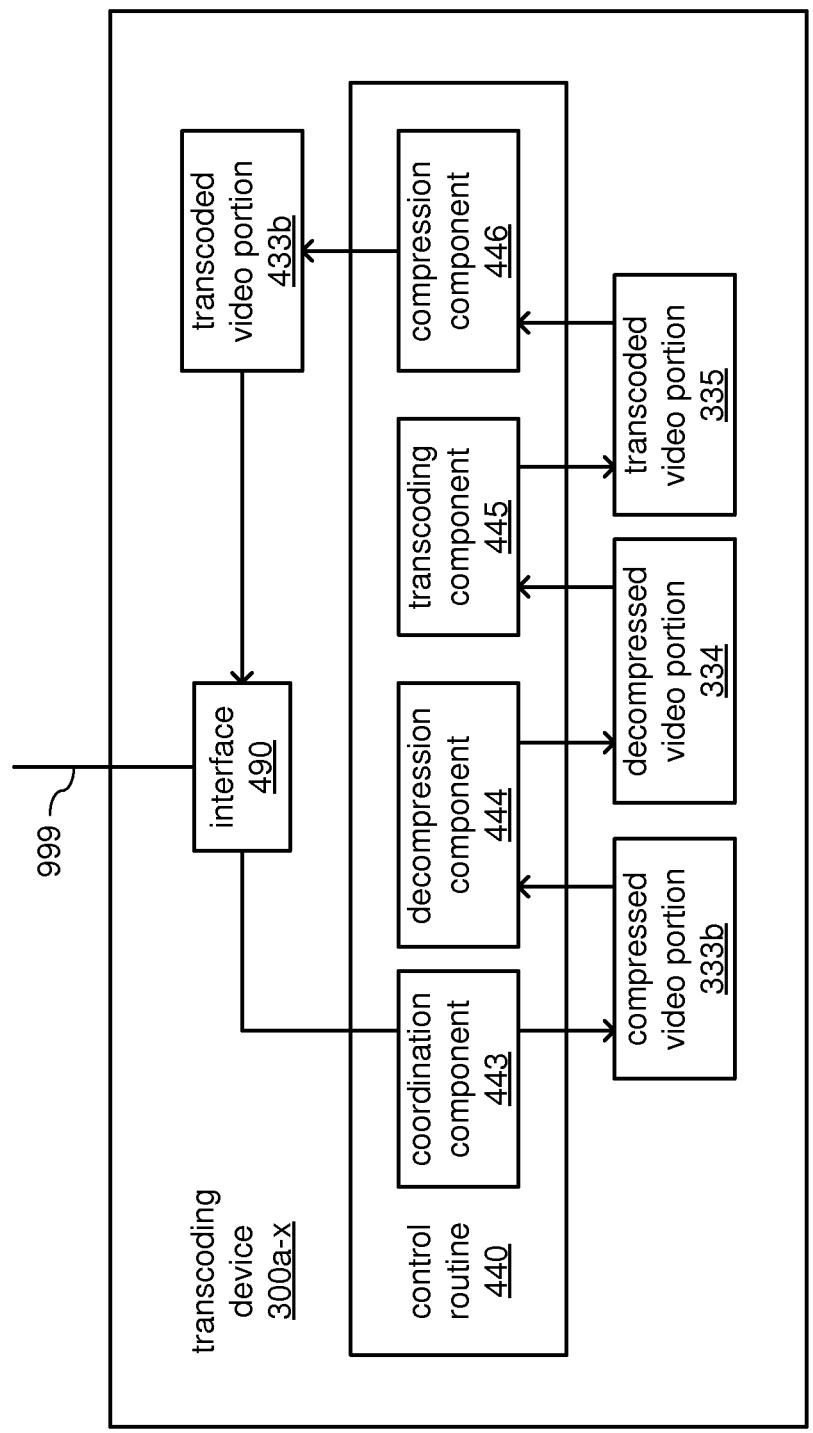
FIG. 8 illustrates another portion of an example embodiment.

The control routine 440 incorporates a sequence of instructions operative on the processor component 450 in its role as a main processor component of each of the transcoding devices 400a-x to implement logic to perform various functions. In executing the control routine 440, the processor component 450 of one of the transcoding devices 400a-x may receive, from the assignment device 300, one of the compressed video portions 333a-x to transcode to generate a corresponding one of the transcoded video portions 433a-x. FIG. 8 depicts an example embodiment of such transcoding by any of the transcoding device 300a-x in greater detail. As depicted, the control routine 440 may incorporate one or more of a coordination component 443, a decompression component 444, a transcoding component 445 and a compression component 446. In executing the control routine 440, the processor component 450 may execute one or more of the components 443-446 of the control routine 440.

The coordination component 443 may operate the interface 490 to recurringly transmit indications of the operating state of the one of the transcoding devices 400a-x into which it is incorporated. In response to having transmitted an indication of a state of being available to perform transcoding, the coordination component 443 may receive the compressed video portion 333b from the assignment device 300 via the network 999. The coordination component 443 may store the compressed video portion 333b within the storage 460 for retrieval and decompression by the decompression component 444.

The decompression component 444 may employ the indications of compression parameters specified by messages (e.g., SPS and PPS messages) within the NAL units 233 of the compressed video portion 333b to decompress at least a subset of the compressed frames conveyed within the NAL units 233 to derive the decompressed video portion 334. While the compressed video portion 333b represents a portion of the motion video 880 in compressed form, the decompressed video portion 334 represents the same portion of the motion video 880 in decompressed form. The decompression component 444 may store the decompressed video portion 334 in the storage 460 for retrieval and transcoding by the transcoding component 445.

As previously discussed, any of the compressed video portions 333a-x may begin with NAL units 233 representing a GOP 289 that begins with an IDR frame and that includes a SPS and/or a PPS that precludes the need to refer to either frames or messages of a NAL unit 233 representing a chronologically earlier GOP 289 such that any of the compressed video portions 333a-x may effectively begin with a GOP refresh. This was depicted and discussed with regard to the example generation of both of the compressed video portions 333a and 333b in FIG. 6. Thus, where the compressed video portion 333b of FIG. 8 begins with such NAL units 233 such that the beginning of the compressed video portion 333b is coincident with a GOP refresh, all of the NAL units 233 of the compressed video portion 233 would represent frames of the motion video 880 to be transcoded, and the decompression component 444 may decompress all of the frames represented by the NAL units 233 of the compressed video portion 333b.

However, as also previously discussed, any of the compressed video portions 333a-x may include a combination of NAL units 233 that are duplicated from another of the compressed video portions 333a-x along with the NAL units 233 that are indicated by the assignment device 300 as the ones representing frames of the motion video 880 to be transcoded with the support of at least some of the frames represented by the duplicated NAL units 233. This was depicted and discussed with regard to the example generation of the compressed video portion 333b in FIG. 7. Thus, where the compressed video portion 333b of FIG. 8 includes both NAL units 233 representing frames of the motion video 880 to be transcoded and NAL units 233 duplicated from another of the compressed video portions 333a-x to provide reference frames and/or messages, the decompression component 444 may decompress the frames of the ones of the NAL units 233 indicated by the assignment 300 as the frames to be transcoded while also decompressing frames of one or more of the duplicated NAL units 233 that are needed to serve as reference frames.

Regardless of whether the compressed video portion 333a includes duplicated NAL units 233 of another of the compressed video portions 333a-x, the decompression component 444 may include only the frames of the motion video 880 indicated by the assignment device 300 as the frames to be transcoded in the decompressed video portion 334. The fact that the decompressed video portion 334 represents a portion of the motion video 880 in a decompressed form precludes the need to include reference frames.

As previously discussed, the transcoding performed by the transcoding component 445 of the control routine 440 of each of the transcoding devices 400a-x may be any of variety of types of transcoding. Again, such transcoding may include and is not limited to, transcoding to alter a characteristic of the motion video 880 (e.g., frame rate, pixel resolution, etc.), transcoding to alter the compression of the motion video 880 (e.g., a change in the degree of compression, type of compression, etc.), or transcoding to augment the motion video 880 (e.g., adding subtitles, digital watermarking, etc.). In performing whatever type of transcoding is to be performed, the transcoding component 445 generates the transcoded video portion 335 from the decompressed video portion 334, and may store the transcoded video portion 335 for retrieval and compression by the compression component 446.

The compression component 446 may employ any of a variety of types of compression, including a type conforming to a version of the MPEG specification, to compress the transcoded video portion 335 to generate the transcoded video portion 433a corresponding to the compressed video portion 333a. In so doing, the compression component 446 may generate a new set of NAL units representing frames of the motion video 880 in compressed form along with messages specifying aspects of the compression performed by the compression component 446. In embodiments in which the compression component 446 employs a version of MPEG, the compression component 446 may generate the transcoded video portion 433b to start with a GOP refresh regardless of whether the compressed video portion 333b started with a GOP refresh. Following generation of the transcoded video portion 433b, the transcoded video portion 433b is transmitted to the assembly device 500.

Returning to FIG. 1, in various embodiments, the assembly device 500 incorporates one or more of a processor component 550, a storage 560 and an interface 590 to couple the assembly device 500 to the network 999. The storage 560 stores one or more of a control routine 540, the transcoded video data 530 and a portion buffer 430 in which one or more of the transcoded video portions 433a-x are stored. The control routine 540 incorporates a sequence of instructions operative on the processor component 550 in its role as a main processor component of the assembly device 500 to implement logic to perform various functions.

In executing the control routine 540, the processor component 550 may receive one or more of the transcoded video portions 433a-x via the network 999 from one or more of the transcoding devices 400a-x, and may store those received ones of the transcoded video portions 433a-x within the portion buffer 430. The processor component 550 may assemble the received ones of the transcoded video portions 433a-x to form the transcoded video data 530 within which those ones of the transcoded video portions 433a-x are arranged in an order that places their GOPs in the correct chronological order required to enable the frames of the motion video 880 to be visually presented by the destination device 700 in correct chronological order. As previously discussed, the transcoded video portions 433a-x may include indications of their correct ordering and/or the assignment device 300 may provide the assembly device 500 with such an indication via the network 999. As the processor component 550 forms at least a subset of the transcoded video data 530, the processor component 550 may operate the interface 590 to transmit the transcoded video data 530 to the destination device 700.

As depicted, the destination device 700 may be coupled to the assembly device 500 through the same network 999 as couples others of the computing devices 100, 300, 400a-x and/or 500 to receive the transcoded video data 530 from the assembly device 500. However, in other embodiments, the destination device 700 may be coupled to the assembly device 500 in an entirely different manner. At least a subset of the transcoded video data 530 may be received from the assembly device 500, and may be decompressed to visually present the motion video 880 represented by the transcoded video data 530 on a display 780 of the destination device 700. Alternatively or additionally, at least a subset of the transcoded video data 530 may simply be stored within the destination device 100 for later conveyance to yet another device (not shown).

It should be noted that although the assignment device 300, the transcoding devices 400a-x and the assembly device 500 are all depicted in FIG. 1 as separate devices linked by portions of the network 999, other embodiments are possible in which two or more of these devices may be combined into a single device. By way of example, the assignment device 300 and the assembly device 500 may be combined into a single device to perform the functions of both, including interacting with the transcoding devices 400*a-x* to assign ones of the compressed video portions 333*a-x* thereto and to receive corresponding ones of the transcoded video portions 433*a-x* therefrom. By way of another example, all of the devices 300, 400*a-x* and 500 may be combined into a single device in which each of the transcoding devices 400*a-x* may be implemented as a component of the combined device that maintains its own processor component 450 to enable entirely autonomous performance of transcoding.

Figure 2:
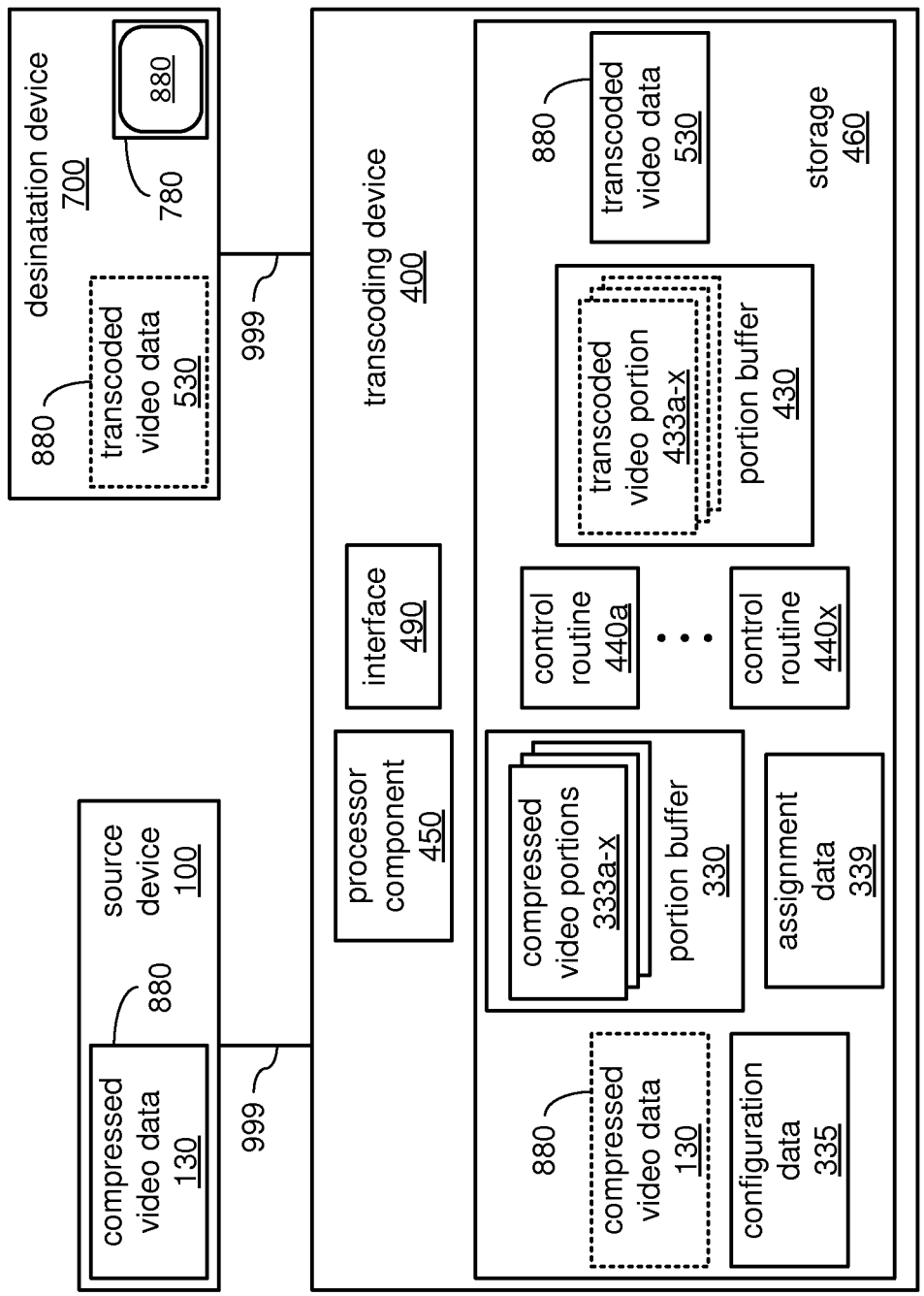
FIG. 2 illustrates an alternate embodiment of a video transcoding system.

FIG. 2 illustrates a block diagram of an alternate embodiment of the transcoding system 1000 that includes the source device 100, the destination device 700 and a single transcoding device 400 that combines the functions of the assignment device 300, all of the transcoding devices 400*a-x* and the assembly device 500 of the embodiment of the transcoding system 100 of FIG. 1. The alternate embodiment of the video processing system 1000 of FIG. 2 is similar to the embodiment of FIG. 1 in many ways, and thus, like reference numerals are used to refer to like elements throughout. However, unlike the transcoding devices 400*a-x* of FIG. 1, the transcoding device 400 of FIG. 2 incorporates the function of all of the separate transcoding devices 400*a-x* within itself as multiple incarnations of the control routine 440, specifically as the depicted control routines 440*a-x* within the storage 460. Assignment of different ones of the compressed video portions 333*a-x* to be transcoded therefore entails assigning one of the control routines 440*a-x* to perform the transcoding, instead of assigning one of multiple distinct transcoding devices 400*a-x* as was the case in FIG. 1. Thus, in the alternate embodiment of the video processing system 1000 of FIG. 2, it is the processor component 450 that assigns each of the compressed video portions 333*a-x* to be transcoded, that performs the transcoding, and that assembles the transcoded video portions 433*a-x* into the transcoded video data 530.

Referring to the embodiments of the transcoding system 1000 of both FIGS. 1 and 2, in various embodiments, each of the processor components 350, 450 and 550 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

In various embodiments, each of the storages 360, 460 and 560 may be based on any of a wide variety of information storage technologies. Such technologies may include volatile technologies requiring the uninterrupted provision of electric power and/or technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the interfaces 390, 490 and 590 may each employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 9:
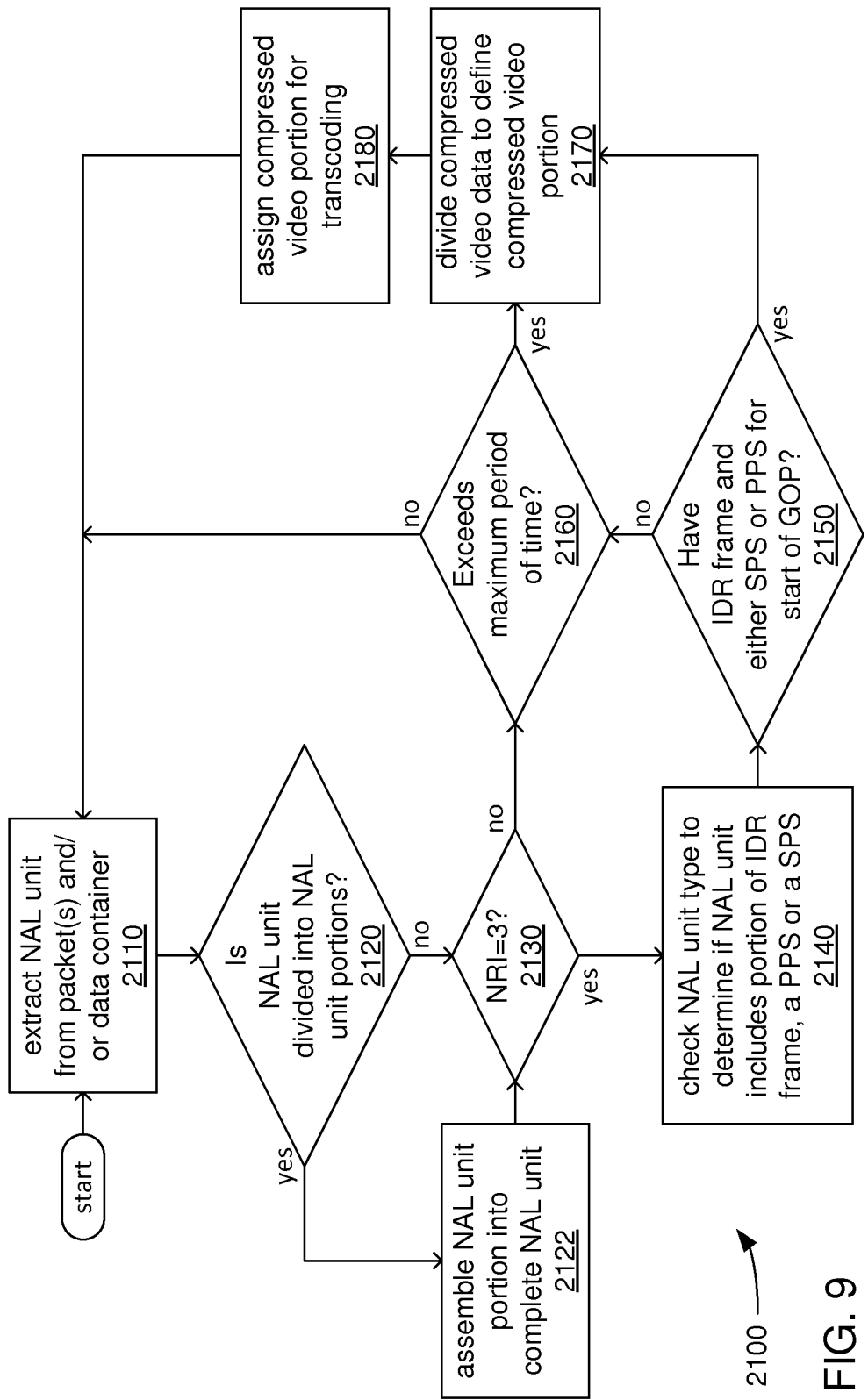
FIGS. 9-11 each illustrate a logic flow according to an embodiment.

FIG. 9 illustrates one embodiment of a logic flow 2100. The logic flow 2100 may be representative of some or all of the operations executed by one or more embodiments described herein. More specifically, the logic flow 2100 may illustrate operations performed by the processor component 350 or 450 in executing at least the control routine 340, and/or performed by other component(s) of the assignment device 300 of FIG. 1 or the transcoding device 400 of FIG. 2.

At 2110, a processor component of a device employed in video transcoding (e.g., the processor component 350 of the assignment device 300 of FIG. 1 or the processor component 450 of the transcoding device 400 of FIG. 2) extracts a NAL unit of compressed video data representing a motion video (e.g., a NAL unit 233 of the compressed video data 130 representing the motion video 880) from one or more packets and/or a data container (e.g., one or more of the packets 239 and/or the data container 237). As previously discussed, the NAL units making up the compressed video data may be provided via a packet-based network and/or via another mechanism, such as removable media. At 2120, if the NAL unit, as extracted, is divided into NAL unit portions, then the processor component assembles the NAL unit portions to form the complete NAL unit at 2122.

At 2130, a check is made as to whether the NAL reference identifier (NRI) in the header of the NAL unit (e.g., the header 232) has a value of three. If the value at 2130 is not three, then the NAL unit cannot be coincident with the start of a GOP that is coincident with a GOP refresh. It should be noted, and as previously discussed, such a specific test for the NRI having a value of three is associated with the use of a type of compression conforming to one or more versions of the MPEG standard. Where another type of compression is used, this test may be for a different parameter having a different value.

If the value is three at 2130, then there is a possibility that the NAL unit may be coincident with the start of a GOP that is coincident with a GOP refresh. To determine either way, a check is made at 2140 as to whether the NAL unit represents a portion of an instantaneous decoder refresh (IDR) frame at the start of a GOP (e.g., one of the GOPs 289), includes a picture parameter set (PPS) message specifying aspects of compression of frames of that GOP and starting with that IDR frame, or includes a sequence parameter set (SPS) message specifying aspects of compression of frames of that GOP starting with that IDR frame.

If the value of the NRI is not three at 2130, or if there hasn't yet been detected both a NAL unit that represents a portion of an IDR frame and another NAL unit that includes a SPS or PPS message specifying compression parameters for at least that IDR frame at 2150, then a check is made at 2160 as to whether the quantity of frames of the motion video represented by the NAL units analyzed since the last GOP refresh represents a period of time that is greater than a predetermined maximum period of time. If that maximum period of time has not yet been exceeded at 2150, then another NAL unit is extracted at 2110.

If the maximum period of time has been exceeded at 2160, or if both a NAL unit that represents a portion of an IDR frame and another NAL unit that includes a SPS or PPS message specifying compression parameters for at least that IDR frame at 2150 have been detected at 2150, then a division is made in the compressed video data at 2170 to define a compressed video portion. As previously discussed, if one GOP refresh is followed by another within a quantity of NAL units representing a quantity of frames of the motion video that represents a period of time that does not exceed the maximum period of time, then the start and end of the compressed video portion defined between the points at which those two GOP refreshes occur need include only the NAL units representing those frames in the portion of the motion video that extends between those two GOP refreshes.

However, if one or both of the start and the end of a compressed video portion are determined as a result of efforts to avoid generating a compressed video portion that includes a quantity of frames to be transcoded that represents a period of time greater than the maximum period of time, then that compressed video portion may include both NAL units representing the frames to be transcoded and NAL units duplicated from another compressed video portion to provide frames that may be referred to by one or more of the frames to be transcoded. In transcoding such a compressed video portion, only the frames to be transcoded are decompressed along with a subset of the frames of the duplicated NAL units that are needed to serve as reference frames.

Following formation of the compressed video portion from the compressed video data at 2160, the compressed video portion is assigned to a transcoding device at 2170. Again, as previously discussed, the assignment for transcoding may alternatively be to another routine implementing a transcoder within the same device.

Figure 10:
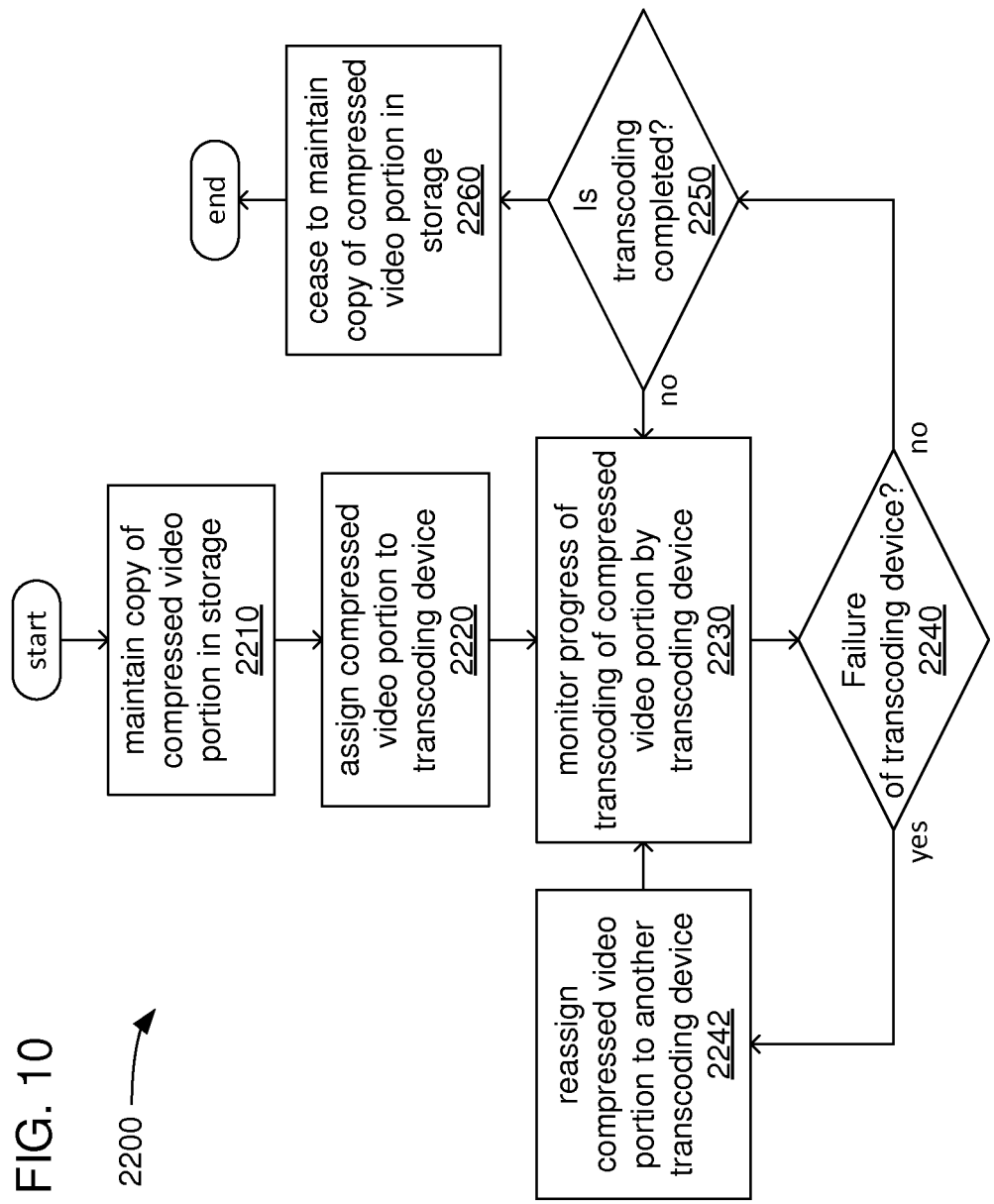

FIG. 10 illustrates one embodiment of a logic flow 2200. The logic flow 2200 may be representative of some or all of the operations executed by one or more embodiments described herein. More specifically, the logic flow 2200 may illustrate operations performed by the processor component 350 or 450 in executing at least the control routine 340, and/or performed by other component(s) of the assignment device 300 of FIG. 1 or the transcoding device 400 of FIG. 2.

At 2210, a processor component of a device employed in video transcoding (e.g., the processor component 350 of the assignment device 300 of FIG. 1 or the processor component 450 of the transcoding device 400 of FIG. 2) maintains in a storage a copy of a compressed video portion generated by dividing compressed video data into portions. At 2220, the processor component assigns that compressed video portion to a transcoding device to be transcoded. Again, as previously discussed, in other embodiments, assignment of a compressed video portion for transcoding could entail assignment to another routine that performs transcoding within the same device, instead of assignment to another device.

At 2230, the processor component monitors the progress of the transcoding of that compressed video portion by the transcoding device. If, at 2240, there is a failure of the transcoding device in transcoding that compressed video portion, then the processor component reassigns that same compressed video portion to another transcoding device to be transcoded at 2242, and monitors the progress of that other transcoding device in performing that transcoding at 2230.

However, if there has not been a failure of the performance of transcoding of that compressed video portion by the transcoding device at 2240, then a check is made as to whether the transcoding is complete at 2250. If the transcoding is not complete at 2250, then the processor component returns to monitoring the progress of the transcoding at 2230. However, if the transcoding is completed at 2250, then the processor component acts to cease to maintain the copy of the compressed video portion in the storage at 2260. As previously discussed, such storage of a copy of a compressed video portion may be for the purpose of enabling reassignment of that compressed video portion to another transcoding device, and may no longer be needed once such transcoding is completed.

Figure 11:
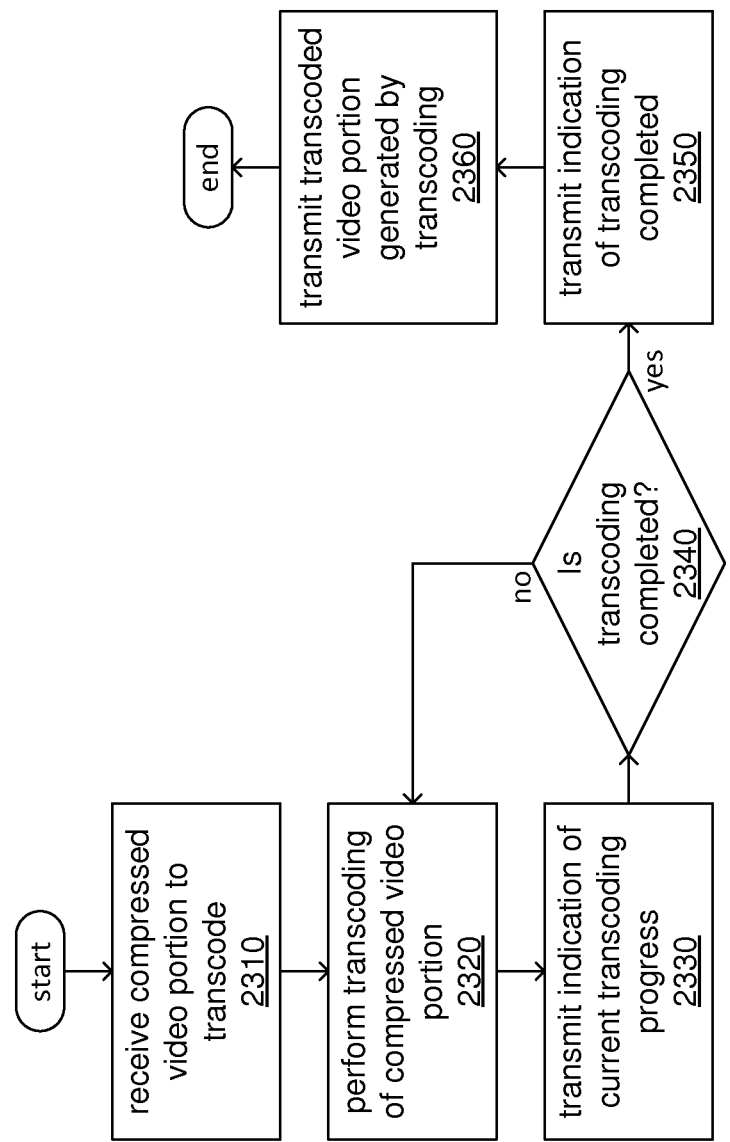

FIG. 11 illustrates one embodiment of a logic flow 2300. The logic flow 2300 may be representative of some or all of the operations executed by one or more embodiments described herein. More specifically, the logic flow 2300 may illustrate operations performed by the processor component 450 in executing at least the control routine 440 or one of the control routines 440*a-x*, and/or performed by other component(s) of one of the transcoding devices 400*a-x* of FIG. 1 or the transcoding device 400 of FIG. 2.

At 2310, a processor component of a transcoding device (e.g., the processor component 450 of one of the transcoding devices 400*a-x* of FIG. 1 or of the transcoding device 400 of FIG. 2) receives a compressed video portion representing a portion of a motion video to transcode from an assignment device (e.g., the assignment device 300). However, as has been discussed, in other embodiments, there may be a routine (e.g., one of the control routines 440*a-x*) that performs transcoding that receives the compressed video portion from another routine assigning it (e.g., the control routine 340), instead of such an assignment taking place between distinct devices.

At 2320, the processor component performs the transcoding of the compressed video portion. As has been discussed, where the compressed video portion includes only NAL units representing (or otherwise associated with) the frames of the motion video that are to be transcoded, then the processor component decompresses and transcodes only those frames. However, where the compressed video portion also includes NAL units duplicated from another compressed video portion and representing other frames of the motion video that are included to serve as reference frames, then the processor component decompresses only the frames to be transcoded along with the ones of the frames of the duplicate NAL units needed to serve as reference frames for the decompression of the frames to be transcoded.

At 2330, the processor component transmits an indication of the current progress of transcoding the compressed video portion. If that transcoding is not complete at 2340, then the processor component 2330 continues to perform the transcoding of the compressed video portion at 2320. However, if the transcoding is complete at 2340, then the processor component transmits an indication of completion of the transcoding at 2350, and transmits the transcoded video portion generated from that transcoding at 2360.

Figure 12:
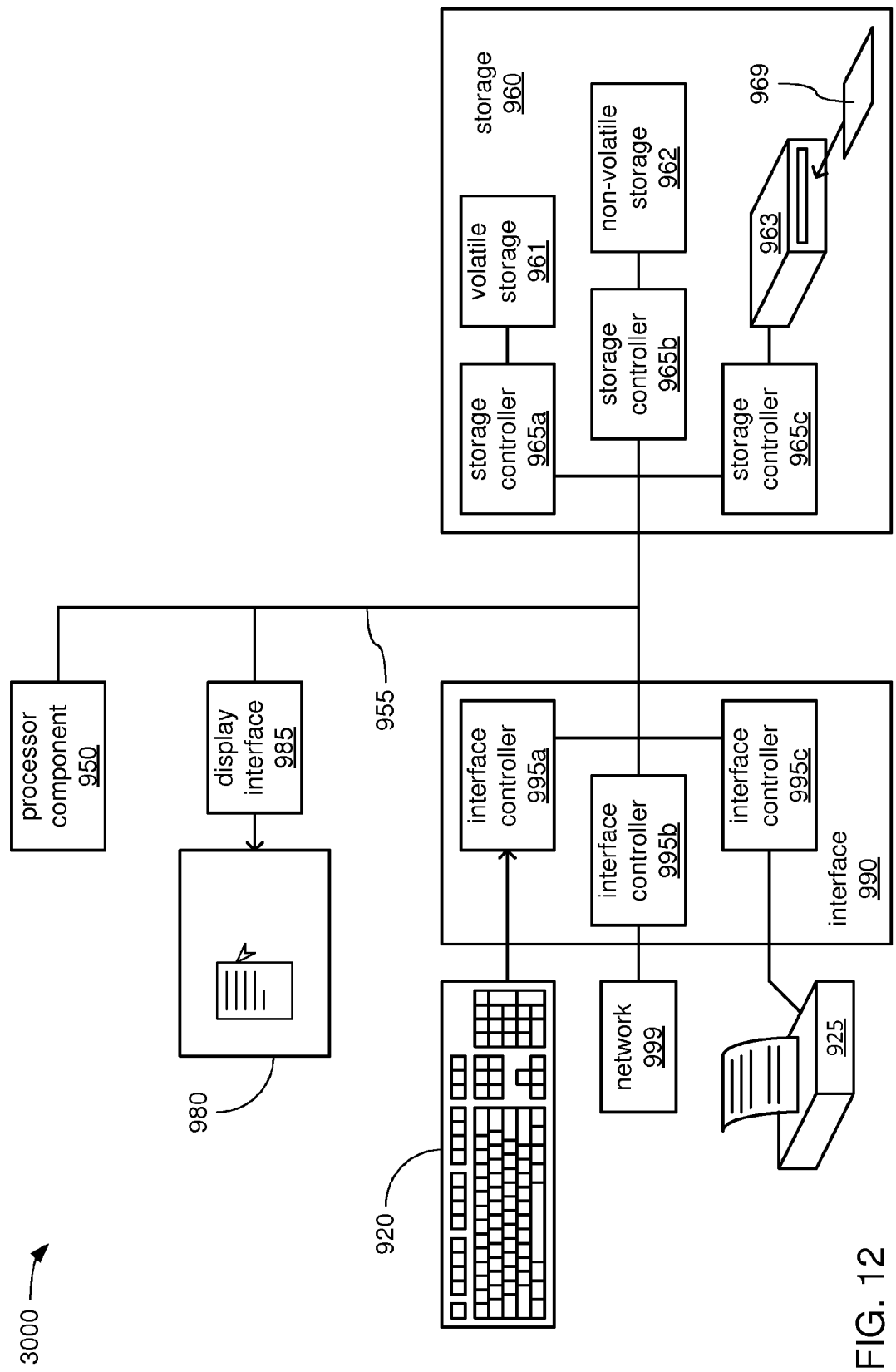
FIG. 12 illustrates a processing architecture according to an embodiment.

FIG. 12 illustrates an embodiment of an exemplary processing architecture 3000 suitable for implementing various embodiments as previously described. More specifically, the processing architecture 3000 (or variants thereof) may be implemented as part of one or more of the computing devices 100, 300, or 600, and/or the controller 400. It should be noted that components of the processing architecture 3000 are given reference numbers in which the last two digits correspond to the last two digits of reference numbers of at least some of the components earlier depicted and described as part of the computing devices 100, 300 and 600, as well as the controller 400. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 955. As will be explained, depending on various aspects of a computing device implementing the processing architecture 3000, including its intended use and/or conditions of use, such a computing device may further include additional components, such as without limitation, a display interface 985.

The coupling 955 includes one or more buses, point-to-point interconnects, transceivers, buffers, crosspoint switches, and/or other conductors and/or logic that communicatively couples at least the processor component 950 to the storage 960. Coupling 955 may further couple the processor component 950 to one or more of the interface 990, the audio subsystem 970 and the display interface 985 (depending on which of these and/or other components are also present). With the processor component 950 being so coupled by couplings 955, the processor component 950 is able to perform the various ones of the tasks described at length, above, for whichever one(s) of the aforedescribed computing devices implement the processing architecture 3000. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 350, 450 and 650) may include any of a wide variety of commercially available processors, employing any of a wide variety of technologies and implemented with one or more cores physically combined in any of a number of ways.

As previously discussed, the storage 960 (corresponding to the storages 360, 460 and 660) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 such that it may include multiple distinct types of storage is in recognition of the commonplace use of more than one type of storage device in computing devices in which one type provides relatively rapid reading and writing capabilities enabling more rapid manipulation of data by the processor component 950 (but which may use a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (corresponding to the interfaces 190, 390 or 690) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

FIG. 13 illustrates an embodiment of a system 4000. In various embodiments, system 4000 may be representative of a system or architecture suitable for use with one or more embodiments described herein, such as the graphics processing system 1000; one or more of the computing devices 100, 300 or 600; and/or one or both of the logic flows 2100 or 2200. The embodiments are not limited in this respect.

As shown, system 4000 may include multiple elements. One or more elements may be implemented using one or more circuits, components, registers, processors, software subroutines, modules, or any combination thereof, as desired for a given set of design or performance constraints. Although a limited number of elements are shown and in a certain topology by way of example, it can be appreciated that more or less elements in any suitable topology may be used in system 4000 as desired for a given implementation. The embodiments are not limited in this context.

In embodiments, system 4000 may be a media system although system 4000 is not limited to this context. For example, system 4000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 4000 includes a platform 4900a coupled to a display 4980. Platform 4900a may receive content from a content device such as content services device(s) 4900c or content delivery device(s) 4900d or other similar content sources. A navigation controller 4920 including one or more navigation features may be used to interact with, for example, platform 4900a and/or display 4980. Each of these components is described in more detail below.

In embodiments, platform 4900a may include any combination of a processor component 4950, chipset 4955, memory unit 4969, transceiver 4995, storage 4962, applications 4940, and/or graphics subsystem 4985. Chipset 4955 may provide intercommunication among processor circuit 4950, memory unit 4969, transceiver 4995, storage 4962, applications 4940, and/or graphics subsystem 4985. For example, chipset 4955 may include a storage adapter (not depicted) capable of providing intercommunication with storage 4962.

Processor component 4950 may be implemented using any processor or logic device, and may be the same as or similar to one or more of processor components 150, 350 or 650, and/or to processor component 950 of FIG. 12.

Memory unit 4969 may be implemented using any machine-readable or computer-readable media capable of storing data, and may be the same as or similar to storage media 969 of FIG. 12.

Transceiver 4995 may include one or more radios capable of transmitting and receiving signals using various suitable wireless communications techniques, and may be the same as or similar to transceiver 995b in FIG. 12.

Figure 14:
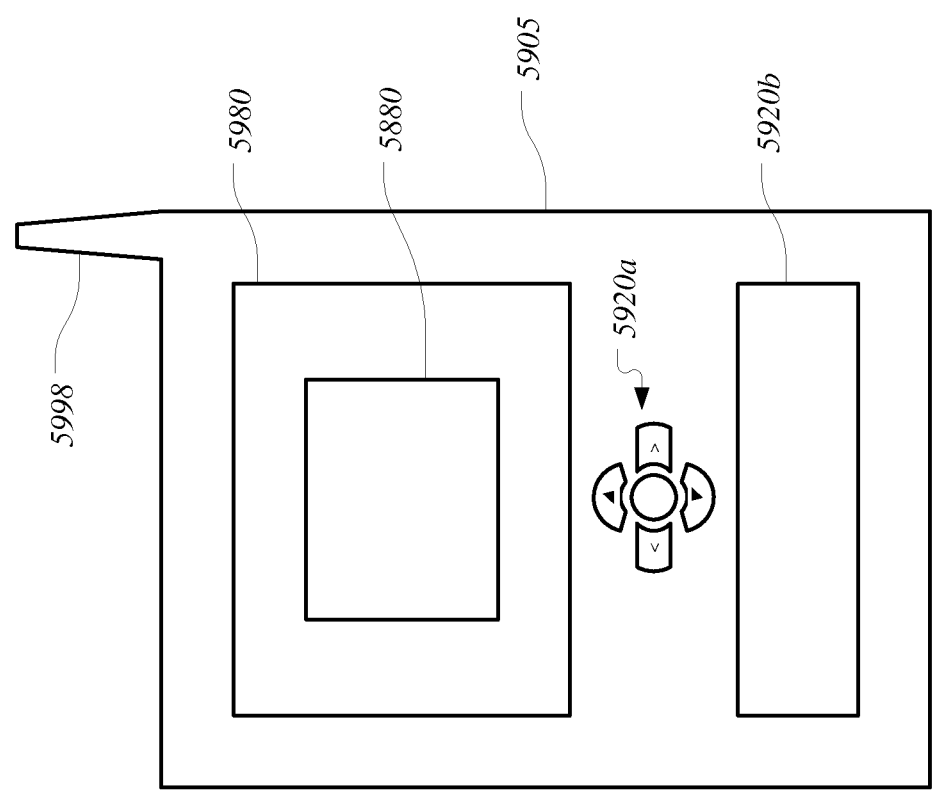
FIG. 14 illustrates an embodiment of a device.

Display 4980 may include any television type monitor or display, and may be the same as or similar to one or more of displays 380 and 680, and/or to display 980 in FIG. 14.

Storage 4962 may be implemented as a non-volatile storage device, and may be the same as or similar to non-volatile storage 962 in FIG. 12.

Graphics subsystem 4985 may perform processing of images such as still or video for display. Graphics subsystem 4985 may be a graphics processing unit (GPU) or a visual processing unit (VPU), for example. An analog or digital interface may be used to communicatively couple graphics subsystem 4985 and display 4980. For example, the interface may be any of a High-Definition Multimedia Interface, DisplayPort, wireless HDMI, and/or wireless HD compliant techniques. Graphics subsystem 4985 could be integrated into processor circuit 4950 or chipset 4955. Graphics subsystem 4985 could be a stand-alone card communicatively coupled to chipset 4955.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 4900b may be hosted by any national, international and/or independent service and thus accessible to platform 4900a via the Internet, for example. Content services device(s) 4900b may be coupled to platform 4900a and/or to display 4980. Platform 4900a and/or content services device(s) 4900b may be coupled to a network 4999 to communicate (e.g., send and/or receive) media information to and from network 4999. Content delivery device(s) 4900c also may be coupled to platform 4900a and/or to display 4980.

In embodiments, content services device(s) 4900b may include a cable television box, personal computer, network, telephone, Internet enabled devices or appliance capable of delivering digital information and/or content, and any other similar device capable of unidirectionally or bidirectionally communicating content between content providers and platform 4900a and/display 4980, via network 4999 or directly. It will be appreciated that the content may be communicated unidirectionally and/or bidirectionally to and from any one of the components in system 4000 and a content provider via network 4999. Examples of content may include any media information including, for example, video, music, medical and gaming information, and so forth.

Content services device(s) 4900b receives content such as cable television programming including media information, digital information, and/or other content. Examples of content providers may include any cable or satellite television or radio or Internet content providers. The provided examples are not meant to limit embodiments.

In embodiments, platform 4900a may receive control signals from navigation controller 4920 having one or more navigation features. The navigation features of navigation controller 4920 may be used to interact with a user interface 4880, for example. In embodiments, navigation controller 4920 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 4920 may be echoed on a display (e.g., display 4980) by movements of a pointer, cursor, focus ring, or other visual indicators displayed on the display. For example, under the control of software applications 4940, the navigation features located on navigation controller 4920 may be mapped to virtual navigation features displayed on user interface 4880. In embodiments, navigation controller 4920 may not be a separate component but integrated into platform 4900a and/or display 4980. Embodiments, however, are not limited to the elements or in the context shown or described herein.

In embodiments, drivers (not shown) may include technology to enable users to instantly turn on and off platform 4900a like a television with the touch of a button after initial boot-up, when enabled, for example. Program logic may allow platform 4900a to stream content to media adaptors or other content services device(s) 4900b or content delivery device(s) 4900c when the platform is turned "off." In addition, chip set 4955 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 4000 may be integrated. For example, platform 4900a and content services device(s) 4900b may be integrated, or platform 4900a and content delivery device(s) 4900c may be integrated, or platform 4900a, content services device(s) 4900b, and content delivery device(s) 4900c may be integrated, for example. In various embodiments, platform 4900a and display 4890 may be an integrated unit. Display 4980 and content service device(s) 4900b may be integrated, or display 4980 and content delivery device(s) 4900c may be integrated, for example. These examples are not meant to limit embodiments.

In various embodiments, system 4000 may be implemented as a wireless system, a wired system, or a combination of both. When implemented as a wireless system, system 4000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 4000 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 4900a may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 13.

As described above, system 4000 may be embodied in varying physical styles or form factors. FIG. 14 illustrates embodiments of a small form factor device 5000 in which system 4000 may be embodied. In embodiments, for example, device 5000 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown, device 5000 may include a display 5980, a navigation controller 5920a, a user interface 5880, a housing 5905, an I/O device 5920b, and an antenna 5998. Display 5980 may include any suitable display unit for displaying information appropriate for a mobile computing device, and may be the same as or similar to display 4980 in FIG. 13. Navigation controller 5920a may include one or more navigation features which may be used to interact with user interface 5880, and may be the same as or similar to navigation controller 4920 in FIG. 13. I/O device 5920b may include any suitable I/O device for entering information into a mobile computing device. Examples for I/O device 5920b may include an alphanumeric keyboard, a numeric keypad, a touch pad, input keys, buttons, switches, rocker switches, microphones, speakers, voice recognition device and software, and so forth. Information also may be entered into device 5000 by way of a microphone. Such information may be digitized by a voice recognition device. The embodiments are not limited in this context.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In Example 1, a device to transcode video imagery includes an analysis component to analyze network abstraction layer (NAL) units of compressed video data that represents a motion video to identify a first group-of-picture (GOP) refresh, and to compare a period of time represented by frames of the motion video following the first GOP refresh to a predetermined maximum period of time; a division component to divide the compressed video data at a first point coincident with the first GOP refresh to define a start of a first compressed video portion, and at a second point to define an end of the first compressed video portion based on the comparison to include a first quantity of frames of the motion video that represents a shorter period of time between the first and second points than the predetermined maximum period of time; and an assignment component to assign the first compressed video portion to a first transcoding device to transcode the first quantity of frames.

In Example 2, which includes the subject matter of Example 1, the assignment component may buffer the first compressed video portion in a storage, monitor a state of progress of transcoding the first quantity of frames by the first transcoding device, and reassign the first compressed video portion to a second transcoding device to transcode the first quantity of frames in response to an indication from the first transcoding device of a transcoding failure.

In Example 3, which includes the subject matter of any of Examples 1-2, the device may include the first and second transcoding devices, the assignment component to maintain the second transcoding device on a standby basis until receipt of the indication of failure from the first transcoding device.

In Example 4, which includes the subject matter of any of Examples 1-3, the device may include a header analysis component to compare a NAL reference identifier (NRI) of a header of a NAL unit of the compressed video data to a value indicative of at least one of an association of the NAL unit to an instantaneous decoder refresh (IDR) frame of a GOP, the NAL unit comprising a sequence parameter set (SPS) message that specifies a compression parameter of at least the IDR, or the NAL unit comprising a picture parameter set (PPS) message that specifies a compression parameter of at least the IDR.

In Example 5, which includes the subject matter of any of Examples 1-4, the device may include a message analysis component to analyze messages of the NAL unit based on the comparison of the header to the value to detect at least one of the SPS or the PPS.

In Example 6, which includes the subject matter of any of Examples 1-5, the analysis component may analyze the NAL units of the compressed video data to identify a second GOP refresh that occurs chronologically within the motion video after the first GOP refresh, and the division component may divide the compressed video portion at the second point coincident with the second GOP refresh based on the second GOP refresh occurring before the quantity of frames of the motion video following the first GOP refresh exceeds the predetermined maximum period of time.

In Example 7, which includes the subject matter of any of Examples 1-6, the division component may define a start of a second compressed video portion at the first point to include duplicates of NAL units representing the first quantity of frames, and may divide the compressed video data at a third point to define an end of the second compressed video portion to include a second quantity of frames of the motion video that represents a shorter period of time between the second and third points than the predetermined maximum period of time.

In Example 8, which includes the subject matter of any of Examples 1-7, the assignment component may assign the second compressed video portion to a second transcoding device to transcode the second quantity of frames with at least one frame of the first quantity of frames employed as a reference frame for decompression of the second quantity of frames by the second transcoding device.

In Example 9, which includes the subject matter of any of Examples 1-8, the device may include an extraction component to extract NAL units of the compressed video data from at least one of packets received from a source device via a network, or a data container comprising the compressed video data and other data.

In Example 10, which includes the subject matter of any of Examples 1-9, the device may include an assembly component to combine NAL unit portions of a NAL unit extracted from a multitude of packets received from the network.

In Example 11, which includes the subject matter of any of Examples 1-10, the device may include an ordering component to order the NAL units of the compressed video data to arrange GOPs represented by the NAL units into chronological order.

In Example 12, which includes the subject matter of any of Examples 1-11, the device may include an interface to transmit at least one of the first compressed video portion to the first transcoding device via a network, or a transcoded video data comprising a transcoded video portion generated by the first transcoding device from the first compressed video portion to a destination device.

In Example 13, which includes the subject matter of any of Examples 1-12, the device may include a display to visually present the motion video as represented by transcoded video data comprising a transcoded portion generated by the first transcoding device from the first compressed video portion.

In Example 14, a device to transcode video imagery includes a coordinating component to indicate availability to perform transcoding to an assignment device to transcode a portion of compressed video data comprising first and second quantities of frames of a motion video, the second quantity of frames indicated by the assignment device to be transcoded; a decompression component to decompress a frame of the first quantity of frames to serve as a reference frame, and to decompress the second quantity of frames using the reference frame to generate a decompressed video portion comprising the second quantity of frames; and a transcoding component to transcode the second quantity of frames of the decompressed video portion to generate a transcoded video portion comprising the second quantity of frames.

In Example 15, which includes the subject matter of Example 14, the coordinating component may transmit an indication of progress of transcoding the second quantity of frames.

In Example 16, which includes the subject matter of any of Examples 14-15, the transcoding of the second quantity of frames may include at least one of altering a frame rate of the second quantity of frames, altering a pixel resolution of the second quantity of frames, altering a degree of compression of the second quantity of frames, or adding subtitles to the second quantity of frames.

In Example 17, which includes the subject matter of any of Examples 14-16, the device may include a compression component to compress the transcoded video portion comprising the second quantity of frames in transcoded form.

In Example 18, which includes the subject matter of any of Examples 14-17, the compression component may generate a GOP refresh at a start of the transcoded video portion to enable the second quantity of frames to be decompressed without reference to any frame of the first quantity of frames.

In Example 19, which includes the subject matter of any of Examples 14-18, the device may include an interface to transmit the transcoded video portion after compression to at least one of the assignment device via a network or an assembly device via the network.

In Example 20, which includes the subject matter of any of Examples 14-19, the coordinating component may receive the portion of the compressed video data from the assignment device via the interface.

In Example 21, a computing-implemented method for transcoding video imagery includes analyzing network abstraction layer (NAL) units of compressed video data that represents a motion video to identify a first group-of-picture (GOP) refresh, dividing the compressed video data at a first point coincident with the first GOP refresh to define a start of a first compressed video portion, comparing a period of time represented by frames of the motion video following the first GOP refresh to a predetermined maximum period of time, dividing the compressed video data at a second point to define an end of the first compressed video portion based on the comparison to include a first quantity of frames of the motion video that represents a shorter period of time between the first and second points than the predetermined maximum period of time, and transmitting the first compressed video portion to a first transcoding device to transcode the first quantity of frames.

In Example 22, which includes the subject matter of Example 21, the method may include maintaining a copy of the first compressed video portion in a storage, monitoring a state of progress of transcoding the first quantity of frames by the first transcoding device, and transmitting the first compressed video portion to a second transcoding device to transcode the first quantity of frames in response to an indication from the first transcoding device of a transcoding failure.

In Example 23, which includes the subject matter of any of Examples 21-22, the method may include comparing a NAL reference identifier (NRI) of a header of a NAL unit of the compressed video data to a value indicative of at least one of an association of the NAL unit to an instantaneous decoder refresh (IDR) frame of a GOP, the NAL unit comprising a sequence parameter set (SPS) message that specifies a compression parameter of at least the IDR, or the NAL unit comprising a picture parameter set (PPS) message that specifies a compression parameter of at least the IDR.

In Example 24, which includes the subject matter of any of Examples 21-23, the method may include analyzing messages of the NAL unit based on the comparison of the header to the value to detect at least one of the SPS or the PPS.

In Example 25, which includes the subject matter of any of Examples 21-24, the method may include analyzing the NAL units of the compressed video data to identify a second GOP refresh that occurs chronologically within the motion video after the first GOP refresh, and dividing the compressed video portion at the second point coincident with the second GOP refresh based on the second GOP refresh occurring before the quantity of frames of the motion video following the first GOP refresh exceeds the predetermined maximum period of time.

In Example 26, which includes the subject matter of any of Examples 21-25, the method may include defining a start of a second compressed video portion at the first point to include duplicates of NAL units representing the first quantity of frames, and dividing the compressed video data at a third point to define an end of the second compressed video portion to include a second quantity of frames of the motion video that represents a shorter period of time between the second and third points than the predetermined maximum period of time.

In Example 27, which includes the subject matter of any of Examples 21-26, the method may include assigning the second compressed video portion to a second transcoding device to transcode the second quantity of frames with at least one frame of the first quantity of frames employed as a reference frame for decompression of the second quantity of frames by the second transcoding device.

In Example 28, which includes the subject matter of any of Examples 21-27, the method may include extracting NAL units of the compressed video data from at least one of packets received from a source device via a network, or a data container comprising the compressed video data and other data.

In Example 29, which includes the subject matter of any of Examples 21-28, the method may include combining NAL unit portions of a NAL unit extracted from a multitude of packets received from the network.

In Example 30, which includes the subject matter of any of Examples 21-29, the method may include ordering the NAL units of the compressed video data to arrange GOPs represented by the NAL units into chronological order.

In Example 31, which includes the subject matter of any of Examples 21-30, the method may include transmitting at least one of the first compressed video portion to the first transcoding device via a network, or a transcoded video data comprising a transcoded video portion generated by the first transcoding device from the first compressed video portion to a destination device.

In Example 32, which includes the subject matter of any of Examples 21-31, the method may include visually presenting on a display the motion video as represented by transcoded video data comprising a transcoded portion generated by the first transcoding device from the first compressed video portion.

In Example 33, at least one machine-readable storage medium includes instructions that when executed by a computing device, cause the computing device to analyze network abstraction layer (NAL) units of compressed video data that represents a motion video to identify a first group-of-picture (GOP) refresh, divide the compressed video data at a first point coincident with the first GOP refresh to define a start of a first compressed video portion, compare a period of time represented by frames of the motion video following the first GOP refresh to a predetermined maximum period of time, divide the compressed video data at a second point to define an end of the first compressed video portion based on the comparison to include a first quantity of frames of the motion video that represents a shorter period of time between the first and second points than the predetermined maximum period of time, and transmit the first compressed video portion to a first transcoding device to transcode the first quantity of frames.

In Example 34, which includes the subject matter of Example 33, the computing device may be caused to maintain a copy of the first compressed video portion in a storage, monitor a state of progress of transcoding the first quantity of frames by the first transcoding device, and transmit the first compressed video portion to a second transcoding device to transcode the first quantity of frames in response to an indication from the first transcoding device of a transcoding failure.

In Example 35, which includes the subject matter of any of Examples 33-34, the computing device may be caused to compare a NAL reference identifier (NRI) of a header of a NAL unit of the compressed video data to a value indicative of at least one of an association of the NAL unit to an instantaneous decoder refresh (IDR) frame of a GOP, the NAL unit comprising a sequence parameter set (SPS) message that specifies a compression parameter of at least the IDR, or the NAL unit comprising a picture parameter set (PPS) message that specifies a compression parameter of at least the IDR.

In Example 36, which includes the subject matter of any of Examples 33-35, the computing device may be caused to analyze messages of the NAL unit based on the comparison of the header to the value to detect at least one of the SPS or the PPS.

In Example 37, which includes the subject matter of any of Examples 33-36, the computing device may be caused to analyze the NAL units of the compressed video data to identify a second GOP refresh that occurs chronologically within the motion video after the first GOP refresh, and divide the compressed video portion at the second point coincident with the second GOP refresh based on the second GOP refresh occurring before the quantity of frames of the motion video following the first GOP refresh exceeds the predetermined maximum period of time.

In Example 38, which includes the subject matter of any of Examples 33-37, the computing device may be caused to define a start of a second compressed video portion at the first point to include duplicates of NAL units representing the first quantity of frames, and divide the compressed video data at a third point to define an end of the second compressed video portion to include a second quantity of frames of the motion video that represents a shorter period of time between the second and third points than the predetermined maximum period of time.

In Example 39, which includes the subject matter of any of Examples 33-38, the computing device may be caused to assign the second compressed video portion to a second transcoding device to transcode the second quantity of frames with at least one frame of the first quantity of frames employed as a reference frame for decompression of the second quantity of frames by the second transcoding device.

In Example 40, which includes the subject matter of any of Examples 33-39, the computing device may be caused to extract NAL units of the compressed video data from at least one of packets received from a source device via a network, or a data container comprising the compressed video data and other data.

In Example 41, which includes the subject matter of any of Examples 33-40, the computing device may be caused to combine NAL unit portions of a NAL unit extracted from a multitude of packets received from the network.

In Example 42, which includes the subject matter of any of Examples 33-41, the computing device may be caused to order the NAL units of the compressed video data to arrange GOPs represented by the NAL units into chronological order.

In Example 43, which includes the subject matter of any of Examples 33-42, the computing device may be caused to transmit at least one of the first compressed video portion to the first transcoding device via a network, or a transcoded video data comprising a transcoded video portion generated by the first transcoding device from the first compressed video portion to a destination device.

In Example 44, which includes the subject matter of any of Examples 33-43, the computing device may be caused to visually present on a display the motion video as represented by transcoded video data comprising a transcoded portion generated by the first transcoding device from the first compressed video portion.

In Example 45, at least one machine-readable storage medium may include instructions that when executed by a computing device, cause the computing device to perform any of the above.

In Example 46, a device to transcode video imagery may include means for performing any of the above.

The invention claimed is:

1. A device to transcode video imagery comprising:
an analysis component to analyze network abstraction layer (NAL) units of compressed video data that represents a motion video to identify a first group-of-picture (GOP) refresh, and to compare a period of time represented by frames of the motion video following the first GOP refresh to a predetermined maximum period of time;
a division component to divide the compressed video data at a first point coincident with the first GOP refresh to define a start of a first compressed video portion, and at a second point to define an end of the first compressed video portion based on the comparison to include a first quantity of frames of the motion video that represents a shorter period of time between the first and second points than the predetermined maximum period of time; and
an assignment component to assign the first compressed video portion to a first transcoding device of plural transcoding devices, to transcode the first quantity of frames.

2. The device of claim 1, the assignment component to buffer the first compressed video portion in a storage, monitor a state of progress of transcoding the first quantity of frames by the first transcoding device, and reassign the first compressed video portion to a second transcoding device to transcode the first quantity of frames in response to an indication from the first transcoding device of a transcoding failure.

3. The device of claim 2, comprising the first and second transcoding devices, the assignment component to maintain the second transcoding device on a standby basis until receipt of the indication of failure from the first transcoding device.

4. The device of claim 1, comprising a header analysis component to compare a NAL reference identifier (NRI) of a header of a NAL unit of the compressed video data to a value indicative of at least one of an association of the NAL unit to an instantaneous decoder refresh (IDR) frame of a GOP, the NAL unit comprising a sequence parameter set (SPS) message that specifies a compression parameter of at least the IDR, or the NAL unit comprising a picture parameter set (PPS) message that specifies a compression parameter of at least the IDR.

5. The device of claim 4, comprising a message analysis component to analyze messages of the NAL unit based on the comparison of the header to the value to detect at least one of the SPS or the PPS.

6. The device of claim 1, the division component to define a start of a second compressed video portion at the first point to include duplicates of NAL units representing the first quantity of frames, and to divide the compressed video data at a third point to define an end of the second compressed video portion to include a second quantity of frames of the motion video that represents a shorter period of time between the second and third points than the predetermined maximum period of time.

7. The device of claim 6, the assignment component to assign the second compressed video portion to a second transcoding device to transcode the second quantity of frames with at least one frame of the first quantity of frames employed as a reference frame for decompression of the second quantity of frames by the second transcoding device.

8. The device of claim 1, comprising a display to visually present the motion video as represented by transcoded video data comprising a transcoded portion generated by the first transcoding device from the first compressed video portion.

9. A computer-implemented method for transcoding video imagery comprising:
analyzing network abstraction layer (NAL) units of compressed video data that represents a motion video to identify a first group-of-picture (GOP) refresh;
dividing the compressed video data at a first point coincident with the first GOP refresh to define a start of a first compressed video portion;
comparing a period of time represented by frames of the motion video following the first GOP refresh to a predetermined maximum period of time;
dividing the compressed video data at a second point to define an end of the first compressed video portion based on the comparison to include a first quantity of frames of the motion video that represents a shorter period of time between the first and second points than the predetermined maximum period of time; and
transmitting the first compressed video portion to a first transcoding device of plural transcoding devices, to transcode the first quantity of frames.

10. The computer-implemented method of claim 9, the method comprising:
defining a start of a second compressed video portion at the first point to include duplicates of NAL units representing the first quantity of frames; and
dividing the compressed video data at a third point to define an end of the second compressed video portion to include a second quantity of frames of the motion video that represents a shorter period of time between the second and third points than the predetermined maximum period of time.

11. The computer-implemented method of claim 10, the method comprising assigning the second compressed video portion to a second transcoding device to transcode the second quantity of frames with at least one frame of the first quantity of frames employed as a reference frame for decompression of the second quantity of frames by the second transcoding device.

12. The computer-implemented method of claim 9, the method comprising visually presenting on a display the motion video as represented by transcoded video data comprising a transcoded portion generated by the first transcoding device from the first compressed video portion.

13. At least one non-transitory machine-readable storage medium comprising instructions that when executed by a computing device, cause the computing device to:
analyze network abstraction layer (NAL) units of compressed video data that represents a motion video to identify a first group-of-picture (GOP) refresh;
divide the compressed video data at a first point coincident with the first GOP refresh to define a start of a first compressed video portion;
compare a period of time represented by frames of the motion video following the first GOP refresh to a predetermined maximum period of time;
divide the compressed video data at a second point to define an end of the first compressed video portion based on the comparison to include a first quantity of frames of the motion video that represents a shorter period of time between the first and second points than the predetermined maximum period of time; and transmit the first compressed video portion to a first transcoding device to transcode the first quantity of frames.

14. The at least one non-transitory machine-readable storage medium of claim 13, the computing device caused to:
maintain a copy of the first compressed video portion in a storage;
monitor a state of progress of transcoding the first quantity of frames by the first transcoding device; and
transmit the first compressed video portion to a second transcoding device to transcode the first quantity of frames in response to an indication from the first transcoding device of a transcoding failure.

15. The at least one non-transitory machine-readable storage medium of claim 13, the computing device caused to compare a NAL reference identifier (NRI) of a header of a NAL unit of the compressed video data to a value indicative of at least one of an association of the NAL unit to an instantaneous decoder refresh (IDR) frame of a GOP, the NAL unit comprising a sequence parameter set (SPS) message that specifies a compression parameter of at least the IDR, or the NAL unit comprising a picture parameter set (PPS) message that specifies a compression parameter of at least the IDR.

16. The at least one non-transitory machine-readable storage medium of claim 15, the computing device caused to analyze messages of the NAL unit based on the comparison of the header to the value to detect at least one of the SPS or the PPS.

17. The at least one non-transitory machine-readable storage medium of claim 13, the computing device caused to:
define a start of a second compressed video portion at the first point to include duplicates of NAL units representing the first quantity of frames; and
divide the compressed video data at a third point to define an end of the second compressed video portion to include a second quantity of frames of the motion video that represents a shorter period of time between the second and third points than the predetermined maximum period of time.

18. The at least one non-transitory machine-readable storage medium of claim 17, the computing device caused to assign the second compressed video portion to a second transcoding device to transcode the second quantity of frames with at least one frame of the first quantity of frames employed as a reference frame for decompression of the second quantity of frames by the second transcoding device.

19. The at least one non-transitory machine-readable storage medium of claim 13, the computing device caused to transmit at least one of the first compressed video portion to the first transcoding device via a network, or a transcoded video data comprising a transcoded video portion generated by the first transcoding device from the first compressed video portion to a destination device.

20. A device to transcode video imagery comprising:
an analysis component to analyze network abstraction layer (NAL) units of compressed video data that represents a motion video to identify a first group-of-picture (GOP) refresh, and to compare a period of time represented by frames of the motion video following the first GOP refresh to a predetermined maximum period of time;
a division component to:
divide the compressed video data at a first point coincident with the first GOP refresh to define a start of a first compressed video portion, and at a second point to define an end of the first compressed video portion based on the comparison to include a first quantity of frames of the motion video that represents a shorter period of time between the first and second points than the predetermined maximum period of time;
use the first point and divide the compressed video data at a third point later than the second point, to define an end of a second compressed video portion based on the comparison to include the first quantity of frames and at least one additional frame of the motion video that represents a shorter period of time between the first and third points than the predetermined maximum period of time; and
an assignment component to:
assign the first compressed video portion to a first transcoding device of plural transcoding devices, to transcode the first quantity of frames.

21. The device of claim 20, the assignment component to:
assign the second compressed video portion to a second transcoding device of plural transcoding devices responsive to a fail in a transcoding by the first transcoding device, to transcode at least the first quantity of frames.

22. The computer-implemented method of claim 9, comprising:
using the first point and dividing the compressed video data at a third point later than the second point, to define an end of a second compressed video portion based on the comparison to include the first quantity of frames and at least one additional frame of the motion video that represents a shorter period of time between the first and third points than the predetermined maximum period of time.

23. The computer-implemented method of claim 9, comprising:
assigning the second compressed video portion to a second transcoding device of plural transcoding devices responsive to a fail in a transcoding by the first transcoding device, to transcode at least the first quantity of frames.

24. The at least one non-transitory machine-readable storage medium of claim 13, comprising:
using the first point and dividing the compressed video data at a third point later than the second point, to define an end of a second compressed video portion based on the comparison to include the first quantity of frames and at least one additional frame of the motion video that represents a shorter period of time between the first and third points than the predetermined maximum period of time.

25. The at least one non-transitory machine-readable storage medium of claim 13, comprising:
assigning the second compressed video portion to a second transcoding device of plural transcoding devices responsive to a fail in a transcoding by the first transcoding device, to transcode at least the first quantity of frames.

* * * * *